US012429809B2

(12) United States Patent
Tokai et al.

(10) Patent No.: US 12,429,809 B2
(45) Date of Patent: Sep. 30, 2025

(54) CLEANING BLADE, METHOD OF MANUFACTURING THE SAME, PROCESS CARTRIDGE, AND IMAGE FORMING APPARATUS

(71) Applicants: Kazuma Tokai, Kanagawa (JP); Naoko Shohji, Shizuoka (JP); Keiichiro Juri, Tokyo (JP); Masahiro Ohmori, Kanagawa (JP); Hideki Kimura, Kanagawa (JP); Makoto Watanabe, Kanagawa (JP); Yosuke Suzuki, Kanagawa (JP); Jun Yamashita, Kanagawa (JP); Yusuke Sasa, Tokyo (JP); Maho Shimokawa, Kanagawa (JP); Toshiki Mori, Kanagawa (JP)

(72) Inventors: Kazuma Tokai, Kanagawa (JP); Naoko Shohji, Shizuoka (JP); Keiichiro Juri, Tokyo (JP); Masahiro Ohmori, Kanagawa (JP); Hideki Kimura, Kanagawa (JP); Makoto Watanabe, Kanagawa (JP); Yosuke Suzuki, Kanagawa (JP); Jun Yamashita, Kanagawa (JP); Yusuke Sasa, Tokyo (JP); Maho Shimokawa, Kanagawa (JP); Toshiki Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/650,335

(22) Filed: Apr. 30, 2024

(65) Prior Publication Data

US 2024/0369960 A1 Nov. 7, 2024

(30) Foreign Application Priority Data

May 1, 2023 (JP) ................................ 2023-075485

(51) Int. Cl.
*G03G 21/00* (2006.01)

(52) U.S. Cl.
CPC . *G03G 21/0017* (2013.01); *G03G 2221/0005* (2013.01)

(58) Field of Classification Search
CPC .................. G03G 21/0017; G03G 2221/0005
See application file for complete search history.

(56) References Cited

U.S. PATENT DOCUMENTS

2014/0119799 A1* 5/2014 Kabata .............. G03G 21/0017 399/350
2014/0205338 A1* 7/2014 Gondoh ............ G03G 21/0017 399/350

(Continued)

FOREIGN PATENT DOCUMENTS

JP H02-082283 A 3/1990
JP 2014-178441 A 9/2014

(Continued)

OTHER PUBLICATIONS

Ohmori et al., U.S. Appl. No. 18/276,215, filed Aug. 1, 2023.
Juri et al., U.S. Appl. No. 18/284,296, filed Sep. 27, 2023.
U.S. Appl. No. 18/400,097, filed Dec. 29, 2023.

*Primary Examiner* — Sandra Brase
(74) *Attorney, Agent, or Firm* — Grüneberg and Myers PLLC

(57) ABSTRACT

A cleaning blade includes an elastic member that includes a front edge surface extending in the longitudinal direction of the elastic member and the thickness direction orthogonal to the longitudinal direction and a bottom surface extending in the depth direction orthogonal to the longitudinal direction and the thickness direction, the bottom surface sharing a front edge ridge part with the front edge surface and facing a cleaning target, and a coating layer coating the front edge surface, the front edge ridge part, and the bottom surface, (Continued)

wherein the front edge ridge part coated with the coating layer is in contact with a surface of the cleaning target, and the coating layer has an average thickness that increases with an increase in a distance from the front edge ridge part in the thickness direction on the front edge surface.

8 Claims, 7 Drawing Sheets

(56) References Cited

U.S. PATENT DOCUMENTS

| | | | | |
|---|---|---|---|---|
| 2016/0033925 | A1* | 2/2016 | Sakon ................ | G03G 21/0017 |
| | | | | 399/350 |
| 2017/0003643 | A1* | 1/2017 | Aoyama ............ | G03G 21/0017 |
| 2022/0221817 | A1 | 7/2022 | Juri et al. | |
| 2022/0317601 | A1 | 10/2022 | Aoki et al. | |
| 2023/0061068 | A1 | 3/2023 | Goto et al. | |
| 2023/0103454 | A1 | 4/2023 | Kikuchi et al. | |
| 2023/0236536 | A1 | 7/2023 | Ohmori et al. | |
| 2023/0384730 | A1 | 11/2023 | Shimada et al. | |
| 2024/0053700 | A1 | 2/2024 | Ohmori et al. | |

FOREIGN PATENT DOCUMENTS

| | | | |
|---|---|---|---|
| JP | 2016142946 | * | 8/2016 |
| JP | 2022-107347 | A | 7/2022 |

* cited by examiner

CLEANING BLADE, METHOD OF MANUFACTURING THE SAME, PROCESS CARTRIDGE, AND IMAGE FORMING APPARATUS

CROSS-REFERENCE TO RELATED APPLICATIONS

This patent application is based on and claims priority pursuant to 35 U.S.C. § 119 to Japanese Patent Application No. 2023-075485, filed on May 1, 2023, in the Japan Patent Office, the entire disclosure of which is hereby incorporated by reference herein.

BACKGROUND

Technical Field

The present disclosure is related to a cleaning blade, a method of manufacturing the cleaning blade, a process cartridge, and an image forming apparatus.

Description of the Related Art

Image forming apparatuses employing electrophotographic methods typically remove residual toner adhering to the surface of an image bearer, or a cleaning target, by a cleaning device after toner images onto a recording medium or intermediate transfer member is transferred. As the cleaning device, cleaning blades are widely used due to their simple configuration and excellent cleaning performance.

Typically, a cleaning blade has an elastic member made of materials such as polyurethane rubber and a supporting member that supports the base end of the elastic member. The elastic member is pressed against the surface of the image bearer at its frond end ridge part to dam and scrape off the toner remaining on the surface of the image bearer.

SUMMARY

According to embodiments of the present disclosure, a cleaning blade is provided that includes an elastic member that includes a front edge surface extending in the longitudinal direction of the elastic member and the thickness direction orthogonal to the longitudinal direction and a bottom surface extending in the depth direction orthogonal to the longitudinal direction and the thickness direction, the bottom surface sharing a front edge ridge part with the front edge surface and facing a cleaning target, and a coating layer coating the front edge surface, the front edge ridge part, and the bottom surface, wherein the front edge ridge part coated with the coating layer is in contact with a surface of the cleaning target, and the coating layer has an average thickness that increases with an increase in a distance from the front edge ridge part in the thickness direction on the front edge surface.

As another aspect of embodiments of the present disclosure, a method of manufacturing the cleaning blade mentioned above is provided that includes dipping the elastic member in a coating liquid with an angle formed between the surface of the coating liquid and the front edge surface is 5 to 45 degrees and pulling up the elastic member from the coating liquid.

As another aspect of embodiments of the present disclosure, a process cartridge is provided that includes the cleaning blade mentioned above.

As another aspect of embodiments of the present disclosure, an image forming apparatus is provided is provided that includes the cleaning blade mentioned above.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
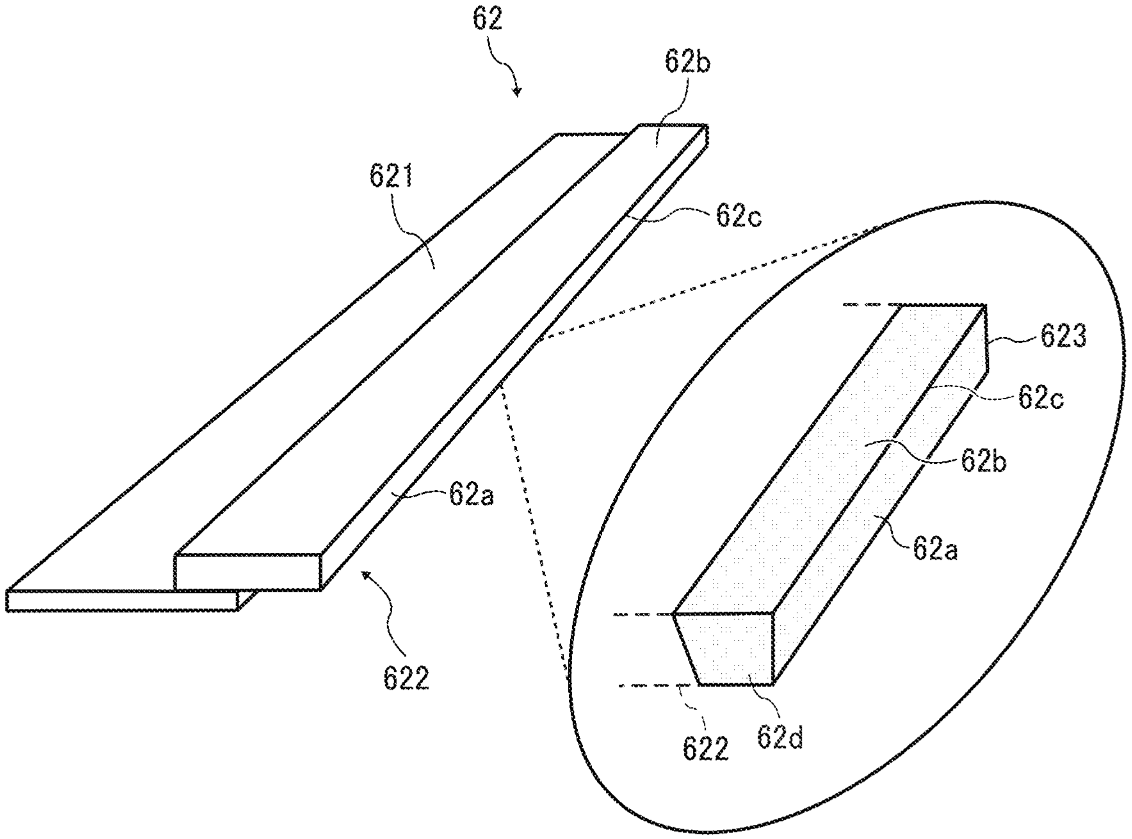
FIG. 1 is a diagram illustrating a schematic perspective view of an example of the cleaning blade of the present disclosure and an enlarged view around the front edge ridge part

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms “a,” “an,” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a cleaning blade is provided that demonstrates excellent cleaning performance and can be prevented from turning up.

A cleaning blade coated with a powder lubricant in the region where the cleaning blade is pressed against the image bearer has been proposed in Japanese Unexamined Patent Application Publication No. H2-82283.

Also, another cleaning blade has been proposed in Japanese Unexamined Patent Application Publication No. 2014-178441, in which the surface layer made of a resin material having a Martens hardness of 50 to 600 $N/mm^2$ is formed at least around the front edge ridge part of the bottom surface of the blade and around the front edge ridge part of the front edge surface of the blade and the Martens hardness measured at the surface at a position 20 μm away from the front edge ridge part of the bottom surface and the Martens hardness measured at the surface at a position 20 μm away from the front edge ridge part of the front edge surface are 1.8 to 12 $N/mm^2$.

A cleaning device equipped with a cleaning blade raises concerns regarding the potential halting of the image bearer's rotation due to an increase in torque, which is required to rotate the image bearing member, caused by friction between the cleaning blade and the image bearer. Additionally, frictional resistance at the contact area (front edge ridge part) between the cleaning blade and the image bearer can cause the cleaning blade to turn up, leading to toner slipping through the turned-up part and ultimately resulting in inadequate cleaning.

Various methods have been proposed to address these issues. These include applying lubricant to the contact area of the cleaning blade, as described in Japanese Unexamined Patent Application Publication No. H2-82283 mentioned above, and modifying the contact area of the cleaning blade with a curable composition. Furthermore, a process known as 'touch-up,' involving the application of toner or zinc stearate metal soap to the contact area of the cleaning blade during the assembly of an image forming apparatus and during the replacement of the cleaning blade, has been employed to prevent the aforementioned issues.

In order to maintain low friction resistance between the cleaning blade and the cleaning target and to prevent the turning-up of the cleaning blade, it is necessary to apply a lubricant film with an appropriate thickness to the cleaning blade. However, the methods proposed in the aforementioned Japanese publication Nos. H2-82283 and 2014-178441 may result in the lubricant film being excessively thick near the front edge ridge part of the cleaning blade. This excessive thickness creates an uneven contact state between the cleaning blade and the cleaning target, raising concerns that the toner to be removed may eventually slip through.

After a thorough investigation, the inventors of the present invention have discovered that configuring a coating layer with an average thickness increasing as it goes away from the front edge ridge part on the front edge surface of the cleaning blade achieves both excellent cleaning performance and prevention of turning up.

Typically, during operation of an image forming apparatus, toner and dust gradually accumulate between the cleaning blade and the image bearer, acting as a lubricant. Therefore, the coating layer on the cleaning blade needs only to have a thickness that exhibits lubricating properties during the brief period from when the image forming apparatus starts operating until the behavior of the cleaning blade stabilizes. From the perspective of cleaning performance, however, it is preferable for the thickness of the coating layer to be thin in order to ensure uniform contact at the front edge ridge part of the cleaning blade.

The present disclosure achieves uniform contact at the front edge ridge part, preventing toner slippage and ensuring an adequate supply of toner and dust to the contact area, by providing a configuration in which the coating layer formed on the elastic member varies in thickness in accordance with the distance from the front edge ridge part. This configuration also maintains low frictional resistance between the cleaning blade and the surface of the cleaning target until sufficient toner and dust are provided, thereby preventing the occurrence of turning up.

Other embodiments of the present disclosure are described below.

Cleaning Blade

Figure 3:
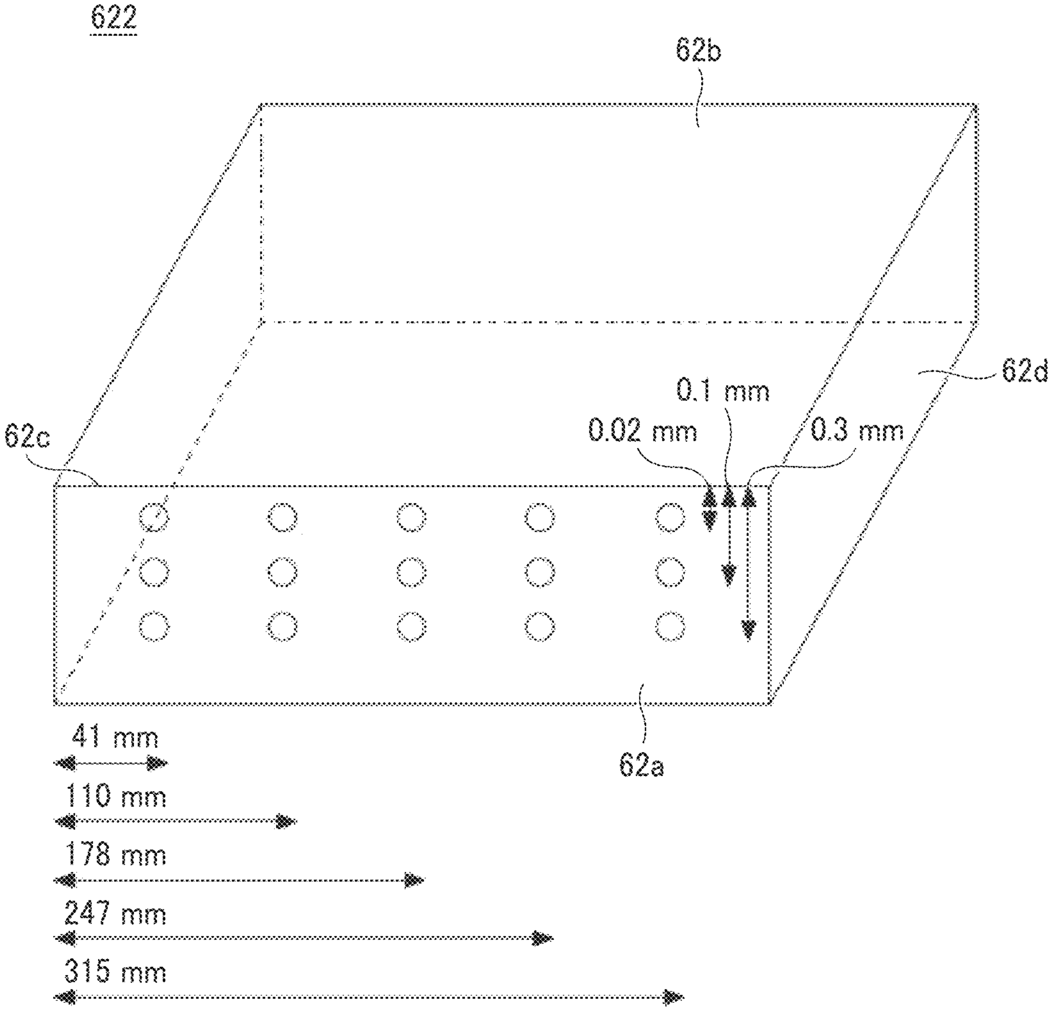
FIG. 3 is a schematic diagram illustrating an example of the measuring position of the average thickness of the coating layer of the cleaning blade of the present disclosure.

The cleaning blade of the present disclosure includes an elastic member that includes a front edge surface extending in the longitudinal direction of the elastic member and the thickness direction orthogonal to the longitudinal direction and a bottom surface extending in the depth direction orthogonal to the longitudinal direction and the thickness direction, the bottom surface sharing a front edge ridge part with the front edge surface and facing a cleaning target, and a coating layer coating the front edge surface, the front edge ridge part, and the bottom surface, wherein the front edge ridge part coated with the coating layer is in contact with a surface of the cleaning target, and the coating layer has an average thickness that increases with an increase in a distance from the front edge ridge part in the thickness direction on the front edge surface. The cleaning blade may optionally include other members. The longitudinal direction, the thickness direction, and the depth direction are along a horizontal two-headed arrow, a perpendicular two-headed arrow, and the direction orthogonal to both two-headed arrows, respectively, as illustrated in FIG. 3, for example.

In the present disclosure, the front edge surface and the bottom surface of the elastic member are also those of the cleaning blade. "Cleaning blade" is also referred to as "blade", "front edge ridge part of cleaning blade" is also referred to "front edge ridge part of blade", "bottom surface of cleaning blade" is also referred to as "bottom surface of blade", and "front edge ridge part" is also referred to as "edge part".

The size and structure of the cleaning target is not particularly limited and they can be suitably selected to suit to a particular application.

The material of the cleaning target is not particularly limited and can be suitably selected to meet specific requirements. It includes metals, plastics, and ceramics.

The shape of the cleaning target can include, for example, drum-shaped, belt-shaped, flat plate-shaped, and sheet-shaped.

The cleaning target is not particularly limited and can be suitably selected to suit to a particular application. It can be an image bearer when applying the cleaning blade to an image forming apparatus.

The residue adheres to the surface of the cleaning target. The residue is not particularly limited as along as it is to be removed with the cleaning blade. It includes, for example, toner, a lubricant, an inorganic fine particle, an organic fine particle, rubbish, dust, or a mixture thereof.

One and other embodiments of the cleaning blade of the present disclosure are described with reference to drawings. The application of the cleaning blade of the present disclosure is not limited to these embodiments.

In each drawing, the same components may be denoted by the same reference numerals (symbols) and redundant description may be omitted. In addition, the present disclosure is not limited to the number, position, and shapes of the embodiments described above and those can be suitably selected to suit to implementing the present disclosure.

FIG. 1

FIG. 1 is a diagram illustrating a schematic perspective view of an example of the cleaning blade of the present disclosure and an enlarged view around the front edge ridge part.

A cleaning blade 62 is structured with a holder 621 made of rigid materials such as metal or hard plastic, along with an elastic blade 622 having a reed-like shape serving as the elastic member.

The cleaning blade 62 is positioned with a front edge ridge part 62*c* of the elastic blade 622 extending along the longitudinal direction while in contact with the surface of the cleaning target.

The elastic blade 622 has a cleaning blade front edge surface 62*a* and a cleaning blade bottom surface 62*b* sharing a front edge ridge part 62*c* with the cleaning blade front edge surface 62*a*. The front edge ridge part 62*c* is one end of the elastic blade 622 on the free end side. The elastic blade 622 also includes a cleaning blade lateral surface 62*d* and a coating layer 623.

The coating layer 623 is formed on the front edge ridge part 62*c*, the cleaning blade front edge surface 62*a*, and the cleaning blade bottom surface 62*b*. The cleaning blade front edge surface 62*a* is parallel to the thickness direction of the elastic blade 622. The cleaning blade bottom surface 62*b* faces a cleaning target.

The elastic blade 622 is fixed onto one end of the holder 621 with such a substance as an additive, and the other end thereof is supported by a member in a cleaning device.

FIG. 2

Figure 2:
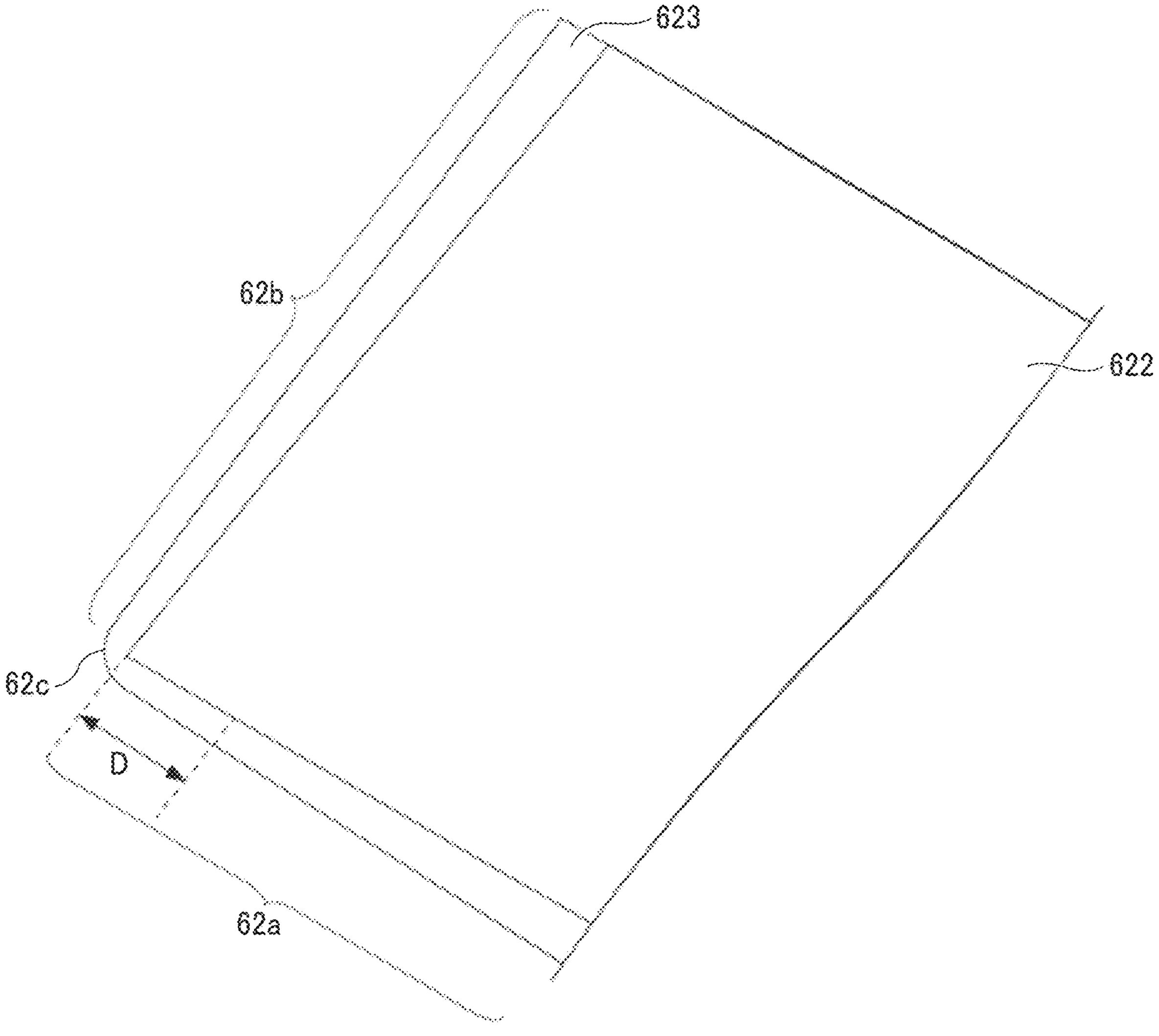
FIG. 2 is a diagram illustrating an enlarged view of an example of around the front edge ridge part in the cleaning blade of the present disclosure.

FIG. 2 is a diagram illustrating an example of the enlarged view around the front edge ridge part in the cleaning blade of the present disclosure.

The elastic blade 622 includes the cleaning blade front edge surface 62*a* and the cleaning blade bottom surface 62*b* both sharing the front edge ridge part 62*c*, which is one end of the free end of the elastic blade 622, along with the coating layer 623 on the cleaning blade bottom surface 62*b*.

"D" in FIG. 2 represents a distance from the front edge ridge part 62*c* of the cleaning blade front edge surface 62*a*.

Elastic Member

As for the shape of the elastic member, it suffices to have a structure capable of removing residue on the cleaning target, and it can be suitably selected to suit to a particular application. Preferably, the contact edge at the contact portion between the elastic member and the cleaning target is linear, and it is more preferable for it to be plate-shaped or reed like-shaped.

As for the material of the elastic member, there are no specific restrictions, and it can be appropriately selected according to a specific application. It is preferable to have a high rebound resilience to be able to follow the eccentricity of a cleaning target and the slight undulation on the surface of the target.

More specifically, regarding the rebound resilience of the elastic member complying with JIS K6255 format (Rubber, vulcanized or thermoplastic—Determination of rebound resilience), it is not particularly limited and can be suitably selected to suit to a particular application. Preferably, it is between 10 and 80 percent at 23 degrees C.

Under the resilience coefficient within a desired range, it is possible to eliminate problems such as cleaning defects caused by insufficient flexibility of the entire elastic member, leading to the inability to follow the oscillation and roughness of an image bearer, as well as excessive rebound causing blade creaking (abnormal noise).

There are no specific limitations on the method of measuring the rebound resilience coefficient of the elastic member. It can be measured, for example, using a No. 221 resilience tester (available from Toyo Seiki Seisaku-sho, Ltd.) in accordance with JIS K6255 format mentioned above at 23 degrees C.

Concrete examples of the elastic material include polyurethane rubber, silicone rubber, fluorine rubber, nitrile rubber (NBR), and ethylene propylene diene rubber (EPDM). Of these, polyurethane rubber is preferable from the perspectives of durability and non-contamination.

This polyurethane rubber elastic member preferably has a Martens hardness of over 0.6 $N/mm^2$ up to 1.5 $N/mm^2$.

A Martens hardness of the urethane rubber exceeding 0.6 $N/mm^2$ is suitable for minimizing the warping of the cleaning blade 62 when a high contact pressure is applied to improve the cleaning performance against the polymerization toner. Specifically, the warping of the cleaning blade 62 causes the so-called belly hit phenomenon, where the cleaning blade bottom surface 62*b* contacts a cleaning target. As a result, the contact area between the cleaning blade 62 and the surface of the target rapidly increases, leading to the reduction of the contact pressure and degradation of the cleaning performance.

This phenomenon may significantly occur particularly in the configuration of the present disclosure having the cleaning blade with a coating layer on the front edge ridge part for cleaning. Therefore, the urethane rubber preferably has a Martens hardness within the above-mentioned numerical range.

There are no specific limitations on the method used to measure Martens hardness, allowing for appropriate selection according to the intended purpose. One such method involves applying a load of 1,000 μN by a Berkovich indenter for 10 seconds using a nanoindenter (ENT-3100, available from ©ELIONIX INC.), maintaining that state for 5 seconds, and then withdrawing the indenter at the same rate over 10 seconds to measure Martens hardness according to ISO 14577 regulation.

There are no specific limitations on the measurement location for Martens hardness. For instance, it can be positioned 20 μm away from the front edge ridge part of the sheet after molding. In this specification, "Martens hardness" refers to the average value obtained by measuring the Martens hardness at 4 to 6 points at each measurement location.

As for the structure of the elastic member, there are no specific limitations, and it can be appropriately selected according to the purpose. Examples include single-layer structures, laminated structures, and laminated structures combining multiple members. Of these, single-layer structures and laminated structures combining multiple members are preferable because they are easier to process in forming the cleaning blade.

For the elastic member including two layers made of different materials, there are no specific limitations on the materials for one layer in contact with the cleaning member (contact layer) and the other layer not in contact with the cleaning member (non-contact layer), and they can be suitably selected to suit to a particular application. The contact layer is preferably made of urethane rubber as described above.

The Martens hardness of the contact layer and the non-contact layer is preferably within the range of 0.6 to 1.5 $N/mm^2$, as described above.

The elastic member can take any size and can be suitably selected to suit to the size of the cleaning target.

Method of Manufacturing Elastic Member

The method of manufacturing the elastic member is not particularly limited and can be suitably selected to suit to a particular application. One such method involves using a polyol compound and a polyisocyanate compound to prepare a polyurethane prepolymer; adding a curing agent and an optional curing catalyst to the polyurethane prepolymer; centrifugally molding the mixture obtained using a specified mold followed by leaving at room temperature; and cutting the resulting material into flat plates to the predetermined dimensions.

Polyol Compound

The polyol compound is not particularly limited and can be suitably selected to suit to a particular application. They include low molecular weight polyols and high molecular weight polyols.

Specific examples of the polyol having a large molecular weight include, but are not limited to, polyester polyol, i.e., a condensation of an alkylene glycol and a aliphatic dibasic acid such as polyester-based polyols such as polyester polyols of alkylene glycol and adipic acid such as ethlylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone based polyols such as polycaprolactone ester polyols obtained by ring-opening polymerization of caprolactone; and polyether-based polyols such as poly (oxytetramethylene) glycol, and poly (oxypropylene) glycol.

These can be used alone or in combination.

Specific examples of the polyol having a low molecular weight include, but are not limited to, diols such as 1,4-butane diol, ethylene glycol, neopentyl glycol, hydroxynone-bis(2-hydroxyethyl)ether, 3,3'-dichloro-4,4'-diamino diphenyl methane, 4,4'-diaminodiphenyl methane, and tri- or higher alcohols such as 1,1-trimethylol propane, glycerine, 1,2,6-hexane triol, 1,2,4-butane triol, trimethylol ethane, 1,1,1-tris(hydroxyethyoxymethyl)propane, diglycerine, and pentaerythritol.

These can be used alone or in combination.

Polyisocyanate Compound

The polyisocyanate compound is not specifically limited and can be chosen appropriately according to the purpose. Specific examples include, but are not limited to, methylene diphenyl diisocyanate (MDI), toluene diisocyanate (TDI), xylene diisocyanate (XDI), naphthalene-1,5-diisocyanate (NDI), tetramethylxylylene diisocyanate (TMXDI), isophorone diisocyanate (IPDI), hydrogenated xylene diisocyanate (H6XDI), dicyclohexylmethane diisocyanate (H12MI), hexamethylene diisocyanate (HDI), dimer acid diisocyanate (DDI), norbornene diisocyanate (NBDI), and trimethylhexamethylene diisocyanate (TMDI).

These can be used alone or in combination.

Curing Agent

The curing agent is not particularly limited and can be suitably selected to suit to a particular application. It includes amines and alcohols.

These can be used alone or in combination.

The curing agent can act to adjust the hardness of the elastic member.

Curing Catalyst

The curing catalyst is not particularly limited and can be suitably selected to suit to a particular application. It includes 2-methylimidazole and 1,2-dimethyl imidazole.

The proportion of the curing catalyst is not particularly limited and can be suitably selected to suit to a particular application. It is preferably from 0.01 to 0.5 percent by mass and more preferably from 0.05 to 0.3 percent by mass to the entire mass of the prepolymer and the curing agent.

Coating Layer

The coating layer may contain a first fluororesin and a second fluororesin incompatible with the first fluororesin, along with other optional components.

The coating layer coats the front edge ridge part, the front edge surface, and the bottom surface. The front edge surface is parallel to the thickness direction of the elastic blade. The cleaning blade faces a cleaning target at the front edge ridge part with the coating layer thereon.

The coating layer may be formed on at least a portion of the elastic member, including the contact edge where the blade and the cleaning target come into contact, or it may be formed over the entire contact edge, or it may be formed over the entire surface of the elastic member.

The coating layer of the cleaning blade preferably includes the following (1) to (3).

(1) The coating layer has an average thickness of from 0.5 to 3 m on the front edge surface at a distance of 0.02 mm from the front edge ridge part.

(2) The coating layer has an average thickness of from 1 to 7 m on the front edge surface at a distance of 0.1 mm from the front edge ridge part.

(3) The coating layer has an average thickness of from 3 to 10 m on the front edge surface at a distance of 0.3 mm from the front edge ridge part.

In other words, it is preferable for the cleaning blade of the present disclosure to have a configuration where the average thickness of the coating layer on the front edge surface of the blade front edge surface is thinner at the front edge ridge part of the cleaning blade and thicker as it extends away from this front edge ridge part.

Specifically, the coating layer may have a continuous increase in average thickness of the coating layer as it extends away from the front edge ridge part, forming a sloped structure, or it may have a stepped increase in average thickness of the coating layer as it extends away from the front edge ridge part. The sloped structure is preferable. Furthermore, as described later in detail, the average thickness of the coating layer can be adjusted, for example, by changing the angle formed between the front edge surface of the blade and the coating liquid surface, as well as the pulling-up speed when pulling up the blade from the coating liquid.

In this specification, "distance from the front edge ridge part of the cleaning blade" may be referred to as "D." For example, "the average thickness of the coating layer when D is 0.02 mm" can be interpreted as "the average thickness of the coating layer at a distance of 0.02 mm from the front edge ridge part of the cleaning blade.

There are no specific limitations on the method of measuring the average thickness of the coating layer. For example, it can be measured by scraping off a part of the coating layer using a spatula or cotton swab, and then conducting shape measurements using a contact surface roughness tester (Surf Test SJ-500: available from Mitutoyo Corporation) or a three-dimensional measuring machine such as a laser microscope (LEXT OLS4100: available from Olympus Corporation). A more specific measurement method involves, for example, as illustrated in FIG. 3, measuring at positions 0.02 mm, 0.1 mm, and 0.3 mm away from the front edge ridge part 62*c* of the cleaning blade front edge surface 62*a*. At each of these positions, measurements can be taken at five points located 41 mm, 110 mm, 178 mm, 247 mm, and 315 mm away from the long side of the cleaning blade lateral surface 62*d*, followed by averaging the obtained values. In FIG. 3, the coating layer 623 is omitted.

First Fluororesin

In this specification, "fluororesin" refers to a resin containing fluorine in its molecule. Preferably, the fluororesin is an olefin polymer containing fluorine, and it is more preferable that the hydrogen atoms in the olefin polymer be replaced with fluorine atoms.

In one embodiment of the present disclosure, it is preferable that the first fluororesin is a domain in the sea-island structure of the coating layer. To form a domain, the type and amount of the first fluororesin is preferably selected considering the combination with the second fluororesin described later.

In this specification, "incompatible" refers to the presence of an interface between mixed substances, indicating a property of not completely mixing, whereas "compatible" refers to the absence of an interface between mixed substances, indicating a property of mixing together.

In this specification, "incompatible state" refers to a state where there is an interface between the first fluororesin and the second fluororesin, and it may be a state where some parts are incompatible.

One aspect of being in an incompatible state is preferably for the coating layer to have a sea-island structure. The sea-island structure refers to a structure where one component, referred to as "sea" (hereinafter, may be referred to as a matrix) in the coating layer formed on the cleaning blade, includes continuous phases, and other components are in the form of "islands" (hereinafter, may be referred to as domains) within the "sea."

In this specification, the sea-island structure means that the domain, which is the first fluororesin, and the matrix, which is the second fluororesin, are in an incompatible state, indicating that there are no parts that are compatible. When the coating layer has a sea-island structure, it is preferable for the domain in this sea-island structure to be in the form of particles.

There are no particular restrictions on the shape of the domain, and it can be suitably selected to suit to a particular application, whether it is regular or irregular. Of these, regular shapes are preferable.

When the shape of the domain is regular, it is preferable for it to be spherical. In the case of a spherical domain, it is preferable for it to be in the form of particles.

Such a shaped domain is suitable for preventing issues such as damage to elastic members in the cleaning blade or cleaning target caused by the first fluororesin detached from the coating layer.

There are no specific restrictions on the volume average particle diameter (50 percent volume diameter, median diameter) of the first fluororesin, and it can be suitably selected to suit to a particular application. It is preferable for the diameter to be from 0.1 to 1 μm, with a preference for 0.5 or less μm, and an even stronger preference for 0.3 or less μm.

A volume average particle diameter of the first fluororesin of 1 or less μm is preferable to prevent sedimentation in a solvent, resulting in unstable dispersion.

A volume average particle diameter of the first fluororesin is 0.5 or less μm is preferable because it can be more stably dispersed in a non-aqueous solvent.

There are no specific restrictions on the method of measuring the volume average particle diameter (50 percent volume diameter, median diameter), and it can be suitably selected to suit to a particular application. For example, it can be measured using techniques such as laser diffraction/scattering, dynamic light scattering, or image imaging. Specific methods include a method of applying particles collected from the coating layer of a cleaning blade to a microtrack (available from NIKKISO CO., LTD.) for measurement using laser diffraction/scattering, and a method of directly measuring fine particles on the cleaning blade by counting them with a scanning electron microscope (SEM).

It should be noted that the volume average particle diameter of the particles does not significantly change between the particles added to a liquid dispersion to be applied to a cleaning blade and those present in the coating layer.

The first fluororesin is not specifically restricted and it can be selected according to the purpose. Specific examples involve, but are not limited to, polytetrafluoroethylene (PTFE), tetrafluoroethylene-perfluoropropylene copolymer (FEP), perfluoroalkoxy polymer (PFA), chlorotrifluoroethylene copolymer (CTFE), tetrafluoroethylene-chlorotrifluoroethylene copolymer (TFE/CTFE), ethylene-chlorotrifluoroethylene copolymer (ECTFE), and polychlorotrifluoroethylene (PCTFE). Of these, polytetrafluoroethylene (PTFE) is preferable to enhance the slidability of the cleaning blade.

Polytetrafluoroethylene (PTFE) can be synthesized as needed or procured. Specific examples of products of PTFE include, but are not limited to, the following brand names: Dion TF Micro Powder TF-9201Z and Dion TF Micro Powder TF-9207Z (both available from 3M Company), Nano FLON 119N and FLUORO E (both available from Shamrock Technologies), TLP10F-1 (available from Mitsui DuPont Fluorochemicals), KTL-500F (available from KITAMURA LIMITED), and Algoflon L203F (available from Solvay S.A.).

Second Fluororesin

Inclusion of the second fluororesin in the coating layer enhances the adhesion of the first fluororesin to the elastic member, thereby preventing detachment of the coating layer. Consequently, it is possible to prevent turning-up and increase in torque of the cleaning blade.

In one embodiment of the present disclosure, it is preferable that the second fluororesin serve as the matrix in a sea island structure of the coating layer.

In combination with the first fluororesin, the resin type and amount of the second fluororesin should preferably be selected to act as the matrix in the sea island structure.

The second fluororesin is not particularly restricted, and it can be suitably selected to suit to a particular application, provided that it allows for the uniform and stable dispersion of the first fluororesin. It includes, for example, vinylidene fluoride (VdF), hexafluoropropylene (HFP), and tetrafluoroethylene (TFE). Of these, a terpolymer of VdF-HFP-TFE is preferable due to its lubricity and adhesion properties with elastic members.

Each component in the terpolymer composition of VdF/IFP/TFE is preferably present in the following molar percentages: 30 to 80 percent for VdF, 10 to 35 percent for HFP, and 5 to 35 percent for TFE, to impart flexibility to a blade and its solubility in a solvent.

Fluorine-based oil may be added to the second fluororesin. Fluorine-based oil added to this fluorine-based makes the second fluororesin function as a binder, and it can also further enhance sliding performances.

Examples of fluorine-based oils include, but are not limited to, oligomers of tetrafluoroethylene (TFE) and those containing perfluoroether as the main backbone.

Fluorine-based oils with perfluoroether as the main backbone are not specifically restricted, and can be suitably selected to suit to a particular application as long as it has good slidability and does not hinder the dispersion of the fluororesin. From the perspective of dynamic viscosity, those with an average molecular weight of 2,000 to 3,500 are preferable.

When using a mixture of the second fluororesin with the fluorine-based oil, the content of the second fluororesin is preferably 90 to 99 percent by mass of the total mass of the mixture, in order to prevent contamination of an image bearer caused by the bled-out fluorine-based oil. It is more preferable for the content to be 95 to 98 percent by mass of the total mass of the mixture.

In the present disclosure, the first fluororesin and the second fluororesin may use the same material or different materials. In the case of the same material, the coating layer can be produced by devising a manufacturing method to make the first fluororesin and the second fluororesin incompatible. For example, by adding the second fluororesin to the pre-cured first fluororesin to cure it, an interface is formed between the first fluororesin and the second fluororesin, allowing the creation of a partially incompatible coating layer. The coating layer can also be produced by mixing the first fluororesin, to which hydrophilic substituents have been added, with the second fluororesin, to which hydrophobic substituents have been added.

Other Optional Components

The other optional components are not particularly limited and can be suitably selected to suit to a particular application. They include, but are not limited to, resin particles other than the fluororesin mentioned above. In this specification, "resin particles other than fluororesin" may be referred to as "other resin particles."

There are no specific restrictions on these other resin particles, and they can be appropriately selected according to the purpose. For example, they include inorganic compound fine particles, acrylic resins, styrene resins, and vinyl resins.

Specific examples of the inorganic compound fine particles include, but are not limited to, silica, alumina, and zirconia.

These can be used alone or in combination.

The shape of the other resin particles is not particularly limited and can be suitably selected to suit to a particular application. It is preferably a spherical shape. Such shaped other resin particles are suitable for preventing issues such as damage to elastic members in the cleaning blade or cleaning target caused by the other resin particles detached from the coating layer.

There are no specific restrictions on the volume average particle diameter (50 percent volume diameter, median diameter) of the other reins particles, and it can be suitably selected to suit to a particular application. It is preferable for the diameter to be from 0.1 to 1 μm, with a preference for 0.5 or less μm, and an even stronger preference for 0.3 or less μm.

A volume average particle diameter of the other resin particles of 1 or less μm is preferable to prevent sedimentation in a solvent, which makes stable dispersion difficult.

When the volume average particle diameter of the other resin particles is 0.5 or less μm, it is preferable because it can be more stably dispersed in a non-aqueous solvent.

Other Members

The other devices are not particularly limited and can be suitably selected to suit to a particular application. It includes a supporting member.

Supporting Member

The shape of the supporting member is not particularly limited and can be suitably selected to suit to a particular application. For example, it can take a board-like shape and a reed-like shape.

There is no specific limitation to the structure of the supporting member. It can be selected to suit to a particular application.

The supporting member can take any size and can be suitably selected to suit to the size of a cleaning target.

The material of the supporting member is not particularly limited and can be suitably selected to meet specific requirements. It includes metals, plastics, and ceramics. Of these, metal is preferable to produce a strong supporting member. It includes steel such as stainless steel, aluminum, and phosphor bronze.

Method of Manufacturing Cleaning Blade

The method of manufacturing a cleaning blade includes dipping, pulling up, and other optional processes such as measuring.

The device for manufacturing the cleaning blade of the present disclosure includes an dipping device, a pulling up device, and other optional devices such as a measuring device.

Dipping

An elastic member is dipped in a coating liquid.

A dipping device dips the elastic member in a coating liquid.

The dipping process can be suitably conducted by the dipping device. Furthermore, since the elastic member is the same as that described in the section of Elastic Member above, its description is omitted.

Coating Liquid

The coating liquid is not particularly limited and can be suitably selected to suit to a particular application as long as it can form a coating layer that excels in cleaning performance and reduces the occurrence of turning up against the elastic member. It is preferable for the coating liquid to include the first fluororesin, the second fluororesin, and a fluorine-based inert liquid.

The "first fluororesin" and the "second fluororesin" are the same as those described in the section of Cleaning Blade mentioned above; therefore, further explanation is omitted.

Fluorine-Based Inert Liquid

The fluorine-based inert liquid is not particularly limited and can be suitably selected to suit to a particular application as long as it is an organic solvent containing fluorine. For instance, it includes, hydrofluoroether (HFE), perfluorocarbon (PFC), and perfluoroether (PFE).

These can be used alone or in combination.

When the coating solution contains the first fluororesin, the second fluororesin, and the fluorine-based inert liquid mentioned above, it is preferable that the total content of the first fluororesin and the second fluororesin be 5 to 10 percent by mass to the total amount of the coating liquid. Additionally, it is preferable that the content of the fluorine-based inert liquid be 90 to 95 percent by mass to the total amount of the coating liquid.

The content of each component in the coating liquid within the above-mentioned numerical ranges results in suitable adjustment of the viscosity of the coating liquid, forming a coating layer with a desired average thickness.

The viscosity of the coating liquid is not particularly limited and can be suitably selected to suit to a particular application. From the perspective of obtaining a coating layer with a suitable average thickness, it is preferable for the viscosity to be between 1.75 mPa·s and 1.95 mPa·s.

There are no particular restrictions on the method of measuring this viscosity; for example, it can be measured using a vibrational viscometer (available from SEKONIC CORPORATION).

In the method of manufacturing the cleaning blade of the present disclosure, the angle formed between the coating liquid surface and the front edge surface of the cleaning blade during the dipping process is 5 to 45 degrees. In this specification, the angle formed between the coating liquid surface and the front edge surface of the cleaning blade is sometimes referred to as the "dipping angle." More specifically, the dipping angle, as illustrated in FIGS. 4A to 4C, represents a coating liquid 600 and a cleaning blade front edge surface 62*a*.

Figure 4C:
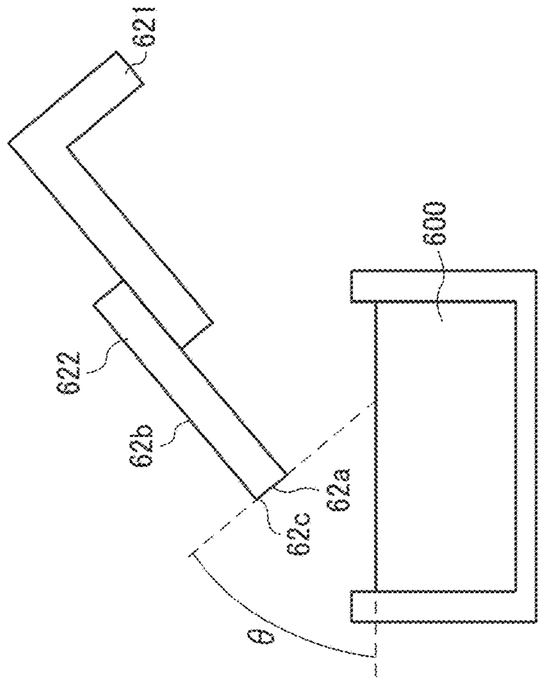
FIG. 4C is a diagram illustrating a view for description of dipping of the elastic member at a dipping angle of 50 degrees (θ=50)
Figure 4B:
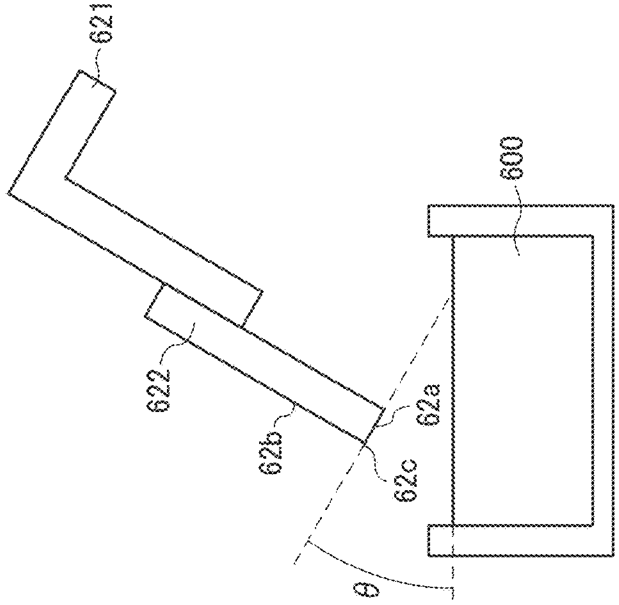
FIG. 4B is a diagram illustrating a view for description of dipping of the elastic member at a dipping angle of 30 degrees (θ=30)
Figure 4A:
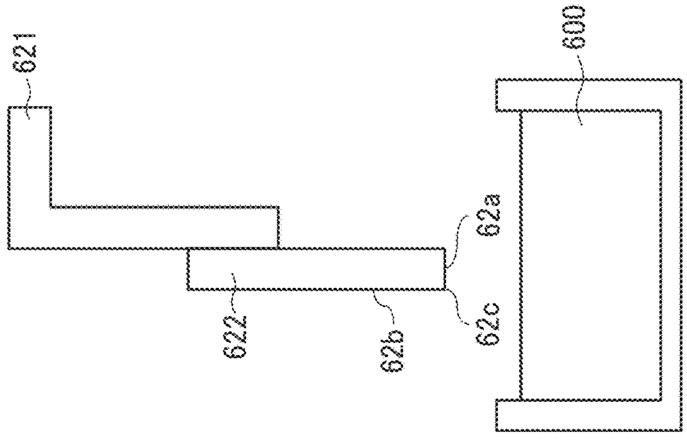
FIG. 4A is a diagram illustrating a view for description of dipping of the elastic member at a dipping angle of 0 degrees (θ=0)

FIG. 4A is a diagram illustrating an explanatory view of an example of the dipping process when the dipping angle is 0 degrees (θ=0), FIG. 4B is a diagram illustrating an explanatory view of an example of the dipping process when the dipping angle is 30 degrees (θ=30), and FIG. 4C is a diagram illustrating an explanatory view of an example of the dipping process when the dipping angle is 50 degrees (θ=50).

The dipping angle is preferably 5 to 45 degrees to obtain a cleaning blade that can achieve excellent cleaning performance and prevent turning-up. Furthermore, it is more preferable for the dipping angle to be 30 degrees.

Pulling Up

In the pulling up process, the elastic member is pulled up from the coating liquid. In the pulling up process, the elastic member is pulled up from the coating liquid.

The pulling-up process can be suitably conducted by a corresponding pulling-up device.

The "elastic member" is the same as described in the section of Elastic Member, and the "coating liquid" is the same as described in the section of Coating Liquid; therefore, further explanation is omitted.

In the pulling-up process, the speed of pulling up the elastic member from the coating liquid is not particularly limited and can be suitably selected to suit to a particular application. It is preferably between 5 mm/s and 45 mm/s to obtain a cleaning blade that can achieve excellent cleaning performance and prevent the occurrence of turning-up.

In this specification, the "speed of pulling up the elastic member from the coating liquid" may be referred to as the "pulling-up speed".

Measuring

The measuring process is to measure the content of the first fluororesin, the second fluororesin, and the fluorine-based inert liquid in the coating liquid.

The measuring device is a tool used to measure the content of the first fluororesin, the second fluororesin, and the fluorine-based inert liquid in the coating liquid.

This measuring process can be suitably carried out by the measuring device.

Furthermore, the "coating liquid," the "first fluororesin," the "second fluororesin," and the "fluorine-based inert liquid" are the same as those described in the section of Cleaning Blade and Coating Liquid, so further explanation is omitted.

The measuring method is not particularly limited and it can be selected as appropriate according to the purpose, as long as it is capable of executing measuring the content of each component in the coating liquid. One such method is measuring based on heating residue as described in Section 2 of JIS K 5601-1-2 format (Testing methods for paint components—Part 1: General rule—Section 2: Determination of non-volatile matter content).

Based on the results obtained from the measuring process, it is possible to replenish the fluorine-based inert liquid to the coating liquid and adjust the content of the first fluororesin, the second fluororesin, and the fluorine-based inert liquid in the coating liquid.

Additionally, based on the results obtained from the measuring process, it is possible to adjust the pulling-up speed of the elastic member in the pulling-up process.

The fluorine-based inert liquid contained in the coating solution is volatile, so that the content (ratio) of each component in the coating liquid may vary over time. As the fluorine-based inert liquid evaporates and the content (ratio) of the first fluororesin and the second fluororesin in the coating liquid increases, the viscosity of the coating liquid may increase.

Therefore, the fluorine-based inert liquid is replenished to the coating liquid, thereby maintaining the coating liquid at an appropriate viscosity, and the pulling-up speed is adjusted in accordance with the viscosity of the coating liquid, so that a more accurate and stable coating layer can be formed.

One embodiment of the method of manufacturing the cleaning blade of the present disclosure are described with reference to drawings.

FIG. 5

Figure 5:
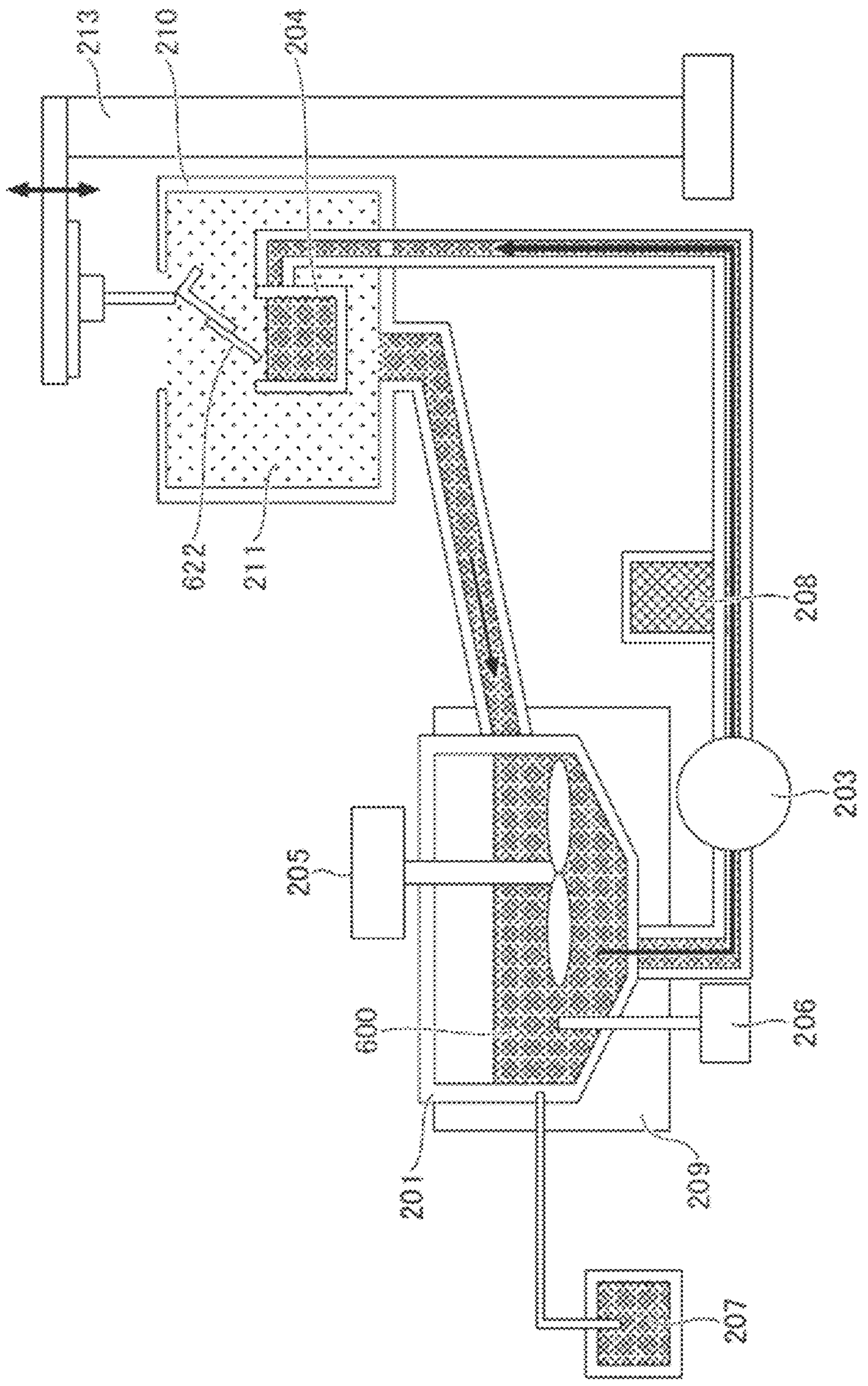
FIG. 5 is a schematic diagram illustrating a dipping device according to an embodiment of the present disclosure.

FIG. 5 is a schematic diagram illustrating a dipping device according to an embodiment of the present disclosure.

The dipping device includes a storage tank 201, the coating liquid 600, a lubrication pump 203, a coating tank 204, an agitator 205, a viscometer 206, a fluorine-based inert liquid 207, a filter 208, a cooling jacket 209, a hood 210, a steam chamber 211, and an elevator 213.

The storage tank 201 stores the coating liquid 600, which is pumped to the coating tank 204 by the lubrication pump 203. The coating liquid 600 that has overflown from the coating tank 204 circulates back to the storage tank 201. The filter 208 is provided on the circulation path to remove impurities from the coating liquid 600.

The storage tank 201 is accompanied by an agitator 205, which stirs the coating liquid 600 to prevent the settling of the first and second fluororesins within it. The storage tank 201 includes a viscometer 206 for measuring the viscosity of the coating liquid 600 to indirectly measure the ratio of each component in it. Depending on the measurement results, the fluorine-based inert liquid 207 is added at any time to the coating liquid 600 to maintain a constant ratio of each component.

Around the storage tank 201 is provided a cooling jacket 209 to maintain a constant temperature by circulating cold water. The hood 210 is mounted around the coating tank 204 to form a steam chamber 211, reducing the evaporation of the fluorine-based inert liquid.

The elevator 213 holds an elastic blade 622, which is immersed in the coating liquid 600 within the coating tank 204 and then pulled up to complete the dip coating process.

Image Forming Apparatus and Image Forming Method

The image forming apparatus of the present disclosure may have a cleaning blade as a cleaning device, and optionally may have an image bearer, a charging device for charging the surface of the image bearer, an exposure device for exposing the charged image bearer to form a latent electrostatic image, a developing device for developing the latent electrostatic image with toner to form a visible image, a transferring device for transferring the visible image onto a recording medium, a fixing device for fixing the transferred image on the recording medium, and other devices.

The image forming method relating to the present disclosure may include a charging process, an exposure process, a developing process, a transferring process, a fixing process, a cleaning process, and other processes. A combination of the charging process and the exposure process are also referred to as a latent electrostatic image formation process.

The "cleaning blade" mentioned herein is the same as described in the section of Cleaning Blade, and thus further explanation is omitted.

The image forming method can be suitably implemented by the image forming apparatus, wherein the charging process can be suitably conducted by the charging device, the exposure process can be suitably conducted by the exposure device, the developing process can be suitably conducted by the developing device, the transferring process can be suitably conducted by the transferring device, the fixing process can be suitably conducted by the fixing device, the cleaning device can be suitably conducted by the cleaning device, and the other processes can be suitably conducted by the other devices.

Image Bearer

There is no specific limit to the image bearer with regard to the material, shape, structure, and size thereof, and it can be suitably selected from any known image bearers to suit to a particular application. The image bearer suitably employs a drum-like or belt-like shape. Also, an inorganic image bearer made of amorphous silicon or selenium, or an organic image bearer made of polysilane, or phthalopolymethine is suitably used.

As the organic photoconductor, one such photoconductor includes a laminated type photoconductor having a laminated structure containing a layer (charge generation layer) in which charge-generating materials such as non-metallic phthalocyanine or titanyl phthalocyanine are dispersed in a binder resin and a layer (charge transport layer) in which charge transport materials are dispersed in a binder resin These layers are stacked on a support such as an aluminum drum. Another example is a single-layer type photoconductor having a single-layer structure with a photosensitive layer containing both charge-generating materials and charge transport materials dispersed in a binder resin on a support. In the single-layer type photoconductor, it is also possible to add hole transport agents and electron transport agents as charge transport materials to the photosensitive layer. Additionally, the option exists to include an undercoat layer between the substrate and either the charge-generating layer in the laminate photoconductor or the photosensitive layer in the single-layer photoconductor.

Charging Process and Charging Device

The charging process involves charging the surface of an image bearer, which is carried out by the charging device.

The charging device is not particularly limited and can be suitably selected to suit to a particular application as long as it is capable of charging the surface of the image bearing member.

Specific examples include, but are not limited to, a known contact type charger that includes an electroconductive or semiconductive roller, brush, film, or a rubber blade, and a non-contact type charger using corona discharging such as corotron and scorotron.

The shape of the charging device may vary. For example, it can take the form of rollers, magnetic brushes, and fur brushes, and can be selected according to the specifications and configuration of an electrophotographic image forming apparatus.

When a magnetic brush is used as a charging device, the magnetic brush is formed of a charging member made of, for example, ferrite particles such as Zn—Cu ferrite, a non-magnetic electroconductive sleeve to support the charging member, and a magnet roll disposed inside the electroconductive sleeve.

When a fur brush is used as the charging device, fur electroconductively-treated by carbon, copper sulfide, metal, or metal oxide is used as fur brush material, which is rolled round or attached to metal or electroconductively treated core metal to obtain the charging member.

The charger is not limited to the contact type charger described above, but using such a contact type charger is preferable to obtain an image forming apparatus with such a charger producing a less amount of ozone.

It is preferable to apply a direct voltage or a voltage obtained by superimposing an alternating voltage to a direct voltage to the surface of the image bearer by the charger arranged in contact with or in the vicinity of the latent image bearer.

The charging device is preferably a charging roller disposed in contact with the image bearer with a gap tape therebetween. It is preferable that the charging roller apply a direct voltage on which an alternate voltage is superimposed to charge the surface of the image bearer.

Exposure Process and Exposure Device

The exposure process involves exposing the surface of a charged image bearer, and is carried out by the exposure device. This exposure can be carried out, for example, by exposing the surface of the image bearer in a patterned manner using the exposure device.

In exposure, the optical system can be broadly classified into analog optical systems and digital optical systems. The analog optical system directly projects the original document onto the surface of an image bearer. The digital optical system receives image information as electrical signals, converts the electrical signals into optical signals, and exposes and forms images on an image bearer.

As for the exposure device, as long as it is capable of exposing the charged image bearer to form a latent electrostatic image, there is no particular limitation, and various exposure devices such as a copying optical system, a rod lens array system, a laser optical system, a liquid crystal shutter optical system, and an LED optical system can be selected to suit to a particular application.

Embodiments of the present disclosure can employ a dorsal irradiation system, where the latent image bearer is irradiated from the rear side in an imagewise manner.

Development Process and Development Device

The developing process involves developing a latent electrostatic image into a toner image, and is carried out by the developing device.

The developing device is not particularly limited and can be suitably selected to suit to a particular application as long as it is capable of developing a latent electrostatic image into a toner image. Various options can be selected depending on the purpose. They include a developing device that houses toner and is capable of applying the toner to the electrostatic latent image either in contact or non-contact manner.

The developing device may be of dry or wet development type, and may be monochrome or multi-color. For example, it may include a mixer for triboelectrically charging the toner, and a rotatable magnetic roller.

Within the developing device, the toner and carrier are mixed and stirred as needed, resulting in the toner becoming charged due to friction. The charged toner is held in a filament-like state on the surface of the rotating magnetic roller, forming a magnetic brush.

The magnetic roller is positioned near the image bearing member, so some of the toner forming the magnetic brush on the surface of the magnetic roller is moved to the surface of the image bearer by the electrostatic attraction force of the latent electrostatic image. As a result, the latent electrostatic image is developed into a toner image on the surface of the image bearer.

The toner housed in the developing device may be a developing agent containing the toner mentioned above, which can be a single-component or two-component developing agent.

Additionally, the toner can be used as a single-component magnetic toner without using a carrier, or as a non-magnetic toner.

Transfer Process and Transfer Device

The transfer process involves transferring the toner image onto a recording medium, and is carried out by the transfer device.

The transfer process preferably includes a primary transfer process, in which the toner image is transferred onto the surface of an intermediate transfer member to form a composite transfer image, and a secondary transfer process, in which the composite transfer image is transferred onto the recording medium.

As for the transfer device, there is no particular limitation as long as it is capable of transferring the toner image onto the recording medium. Depending on the purpose, it is preferable to have a transfer device including a primary transfer device for transferring the toner image onto the surface of the intermediate transfer member to form a composite transfer image, and a secondary transfer device for transferring the composite transfer image onto the recording medium.

The transfer device (the primary transfer device and the secondary transfer device) preferably has at least a transfer unit that peels off and charges the toner image formed on the surface of the image bearer onto the recording medium.

The transferring device is not particularly limited and can be suitably selected to suit to a particular application. It includes a corona transferring device using corona discharge, a transfer belt, a transfer roller, a pressure transfer roller, and an adhesive transferring device. One or more transfer devices can be provided.

A typical example of the recording paper is plain paper but any paper to which a non-fixed image after development can be transferred can be used. PET base for an overhead projector can be also used.

Fixing Process and Fixing Device

The fixing process involves fixing the toner image transferred onto the recording medium, and is carried out by the fixing device. If using two or more colors of toner, each color of toner may be fixed each time it is transferred onto the recording medium, or all colors of toner may be fixed after being transferred and stacked on the recording medium.

The fixing device is not particularly limited and can be suitably selected to suit to a particular application as long as it is capable of fixing the toner image transferred onto the recording medium. The thermal fixing method using a known heating and pressure device can be employed.

The heating and pressure device is not particularly limited and can be suitably selected to suit to a particular application. For example, combinations of heating rollers and pressure rollers, or combinations of heating rollers, pressure rollers, and endless belts can be used.

The heating temperature can be selected as appropriate depending on the purpose. Preferably, the temperature ranges from 80 to 200 degrees C. Depending on particular applications, for example, a known optical fixing device can be used together with the fixing device.

Cleaning Process and Cleaning Device

The cleaning process involves removing the toner remaining on the surface of the image bearer, and is carried out by the cleaning device.

As the cleaning device, a cleaning blade of the present disclosure fixed to a supporting member is used.

The line pressure applied by the cleaning blade of the present disclosure on the surface of the image bearer can be selected as appropriate depending on the purpose, with no specific limitations. It preferably ranges from 10 to 100 N/m and more preferably from 10 to 50 N/m.

When the line pressure is between 10 N/m and 100 N/m, it is preferable because it reduces the occurrence of cleaning defects where the toner passes through the gap between the front end and the cleaning device, and also helps to minimize the tuning-up of the cleaning blade.

The line pressure can be measured, for example, using a measurement device incorporating a small compression-type load cell available from Kyowa Electronic Instruments Co., Ltd.

The angle formed between the tangent of the image bearer at the position where the front end ridge part of the cleaning blade contacts and the front edge surface of the blade (referred to as the “cleaning angle” hereinafter) in the cleaning blade of the present disclosure is not particularly limited and can be suitably selected to suit to a particular application. It is preferably between 65 degrees and 85 degrees.

The cleaning angle between 65 degrees and 85 degrees is preferable to reduce the occurrence of blade turning-up and consequently minimize the occurrence of cleaning defects.

Other Processes and Other Devices

The other processes may include, for example, a quenching process, a recycling process, and a control process.

The other devices include, for example, a quencher, a recycling device, and a control device.

Quenching Process and Quencher

The quenching process applies a quenching bias to an image bearer using a quencher.

The quencher is not particularly limited as long as it can apply a quenching bias to a latent electrostatic image bearer. It is not particularly limited and can be suitably selected to suit to a particular application, including a quenching (discharging) lamp.

Recycling Process and Recycling Device

In the recycling process, the toner removed in the cleaning process mentioned above is returned to the developing device for re-use. This recycling process is suitably conducted by a recycling device.

The recycling device is not particularly limited and can be suitably selected among conveyors known in the art to suit to a particular application.

Control Process and Control Device

The control process mentioned above is to control each process and can be suitably conducted by the control device.

The control device is not particularly limited and can be suitably selected to suit to a particular application. Any control device able to control the behavior of each device can be used. For example, devices such as a sequencer and a computer can be listed.

One example of the image forming apparatus of the present disclosure is described next with reference to accompanying drawings.

FIG. 6

Figure 6:
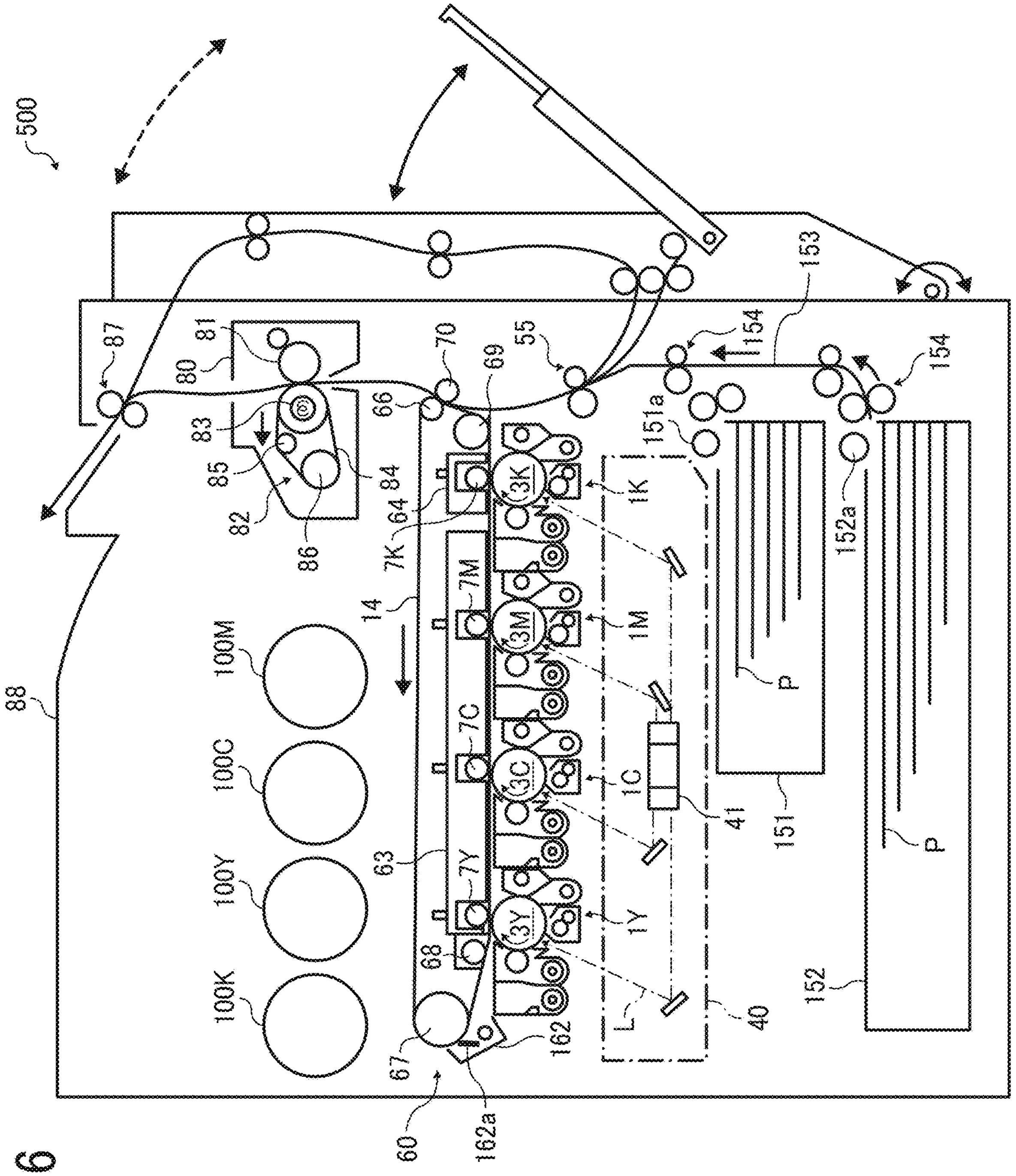
FIG. 6 is a schematic diagram illustrating an imaging unit according to an embodiment of the present disclosure.

FIG. 6 is a schematic diagram illustrating an embodiment of a printer (image forming apparatus) of the present disclosure.

A printer 500 is equipped with four imaging units, referred to as imaging units 1Y, 1C, 1M, and 1K (hereinafter collectively referred to as "each imaging unit 1"), for yellow, magenta, cyan, and black (hereinafter also referred to as Y, C, M, and K, respectively). These units use toners of different colors, Y, M, C, K, as imaging substances to form images, but otherwise have similar configurations.

Above each of the four imaging units 1, a transfer unit 60 equipped with an intermediate transfer belt 14 as an intermediate transfer medium is arranged. The toner images of each color formed on the surfaces of the photoconductors 3Y, 3C, 3M, and 3K (hereinafter collectively referred to as "each photoconductor 3") provided by each imaging unit 1 are transferred and overlaid onto the surface of the intermediate transfer belt 14.

Below each of the four imaging units 1, an optical writing unit 40 is arranged. The optical writing unit 40, as a latent image forming device, emits a laser light L based on image information onto each photoconductor 3 of each imaging unit 1. Consequently, latent electrostatic images for Y, C, M, and K are formed on each photoconductor 3. The optical writing unit 40 deflects laser light L emitted from a light source by a polygon mirror 41 rotated by a motor, and irradiates each photoconductor 3 through multiple optical lenses and mirrors. Alternatively, an optical scanning using an LDE array can be adopted instead of this configuration.

Below the optical writing unit 40, a first paper cassette 151 and a second paper cassette 152 are arranged to overlap in the vertical direction. These paper cassettes contain a bundle of transfer paper P stacked therein as recording media, with the top transfer paper P in each cassette being brought into contact with a first paper feed roller 151*a* or a second paper feed roller 152*a*.

When the first paper feed roller 151*a* rotates counterclockwise in FIG. 6 driven by a driving device, the top transfer paper P in the first paper cassette 151 is fed toward a paper feed path 153 extending vertically to the right side of the cassette in FIG. 6. Similarly, when the second paper feed roller 152*a* rotates counterclockwise in FIG. 6 driven by a driving device, the top transfer paper P in the second paper cassette 152 is ejected toward the paper feed path 153.

Within the paper feed path 153, multiple pairs of conveying rollers 154 are disposed. The transfer paper P fed into the paper feed path 153 is conveyed from the lower side to the upper side in FIG. 6 while being sandwiched between these pairs of conveying rollers 154.

At the downstream end of the conveying direction in the paper feed path 153, a pair of registration rollers 55 are arranged. The pair of registration rollers 55 temporarily stop the rotation of both rollers as soon as the transfer paper P sent from the pair of the conveying rollers 154 arrives. Then they feed out the transfer paper P to a secondary transfer nip at an appropriate timing as described later

FIG. 7

Figure 7:
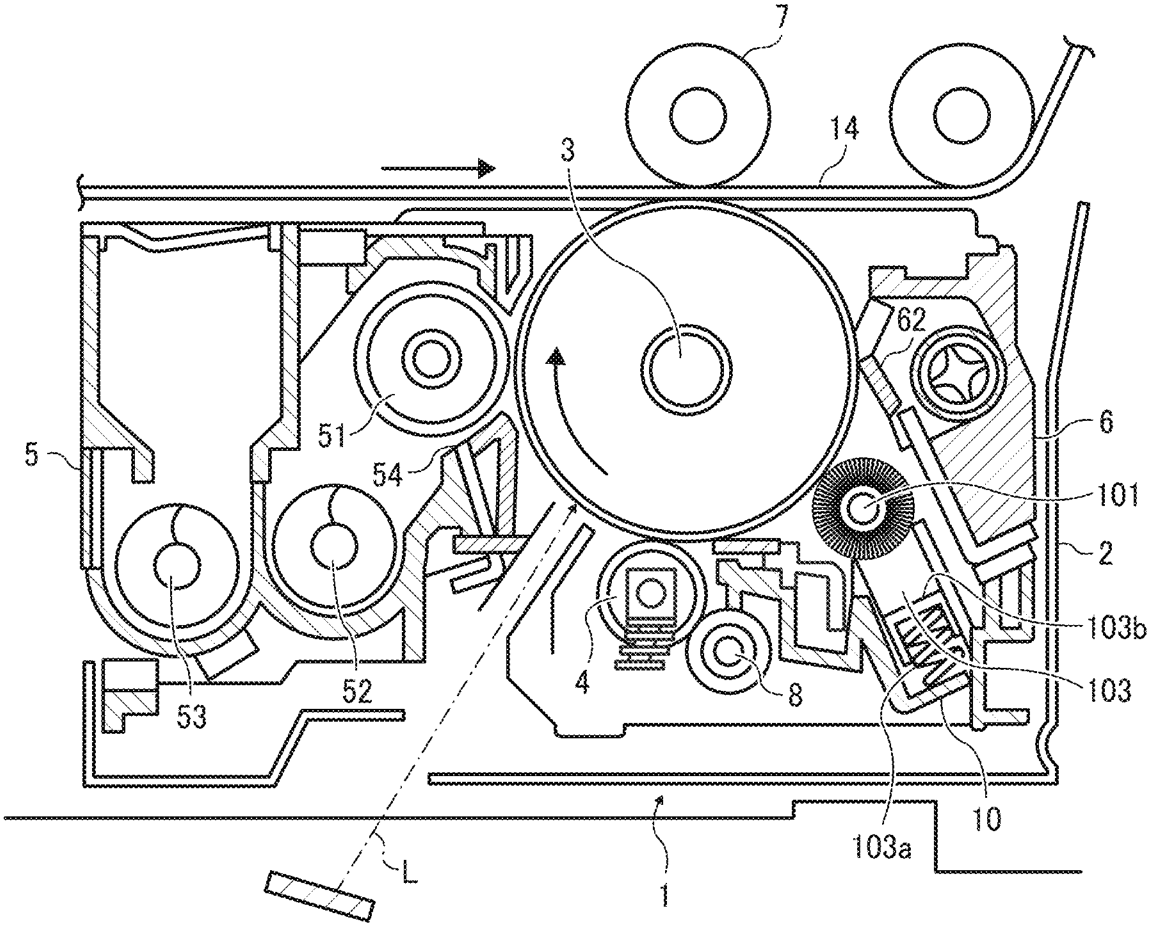
FIG. 7 is a schematic diagram illustrating a printer according to an embodiment of the present disclosure.

FIG. 7 is a schematic diagram illustrating an imaging unit according to an embodiment of the present disclosure.

As illustrated in FIG. 7, the imaging unit 1 includes a drum-shaped photoconductor 3 as an image bearer. In FIG. 7, the photoconductor 3 is depicted as drum-shaped, but it may also be sheet-shaped or endless belt-shaped.

Arranged around the photoconductor 3 are a charging roller 4, a developing unit 5, a primary transfer roller 7, a cleaning device 6, a lubricant application device 10, and a discharging lamp.

The charging roller 4 is a component of the charging device, serving as the charging unit, while the developing unit 5 functions as a developing device to tonerize latent images formed on the surface of the photoconductor 3.

The primary transfer roller 7 serves as a primary transfer member of a primary transfer device that transfers toner images on the surface of the photoconductor 3 to an intermediate transfer belt 14.

The cleaning device 6 removes residual toner on the surface of the photoconductor 3 after transferring toner images to the intermediate transfer belt 14.

The lubricant application device 10 applies lubricant to the surface of the photoconductor 3 after cleaning by the cleaning device 6.

The quenching lamp functions as a quenching device to quench (discharge) the surface potential of the photoconductor 3 after cleaning.

The charging roller 4 is provided around the photoconductor 3 with a predetermined gap, and it charges the photoconductor 3 with a predetermined polarity and a predetermined voltage. The surface of the photoconductor 3 uniformly charged by the charger 4 is exposed to the light beam L emitted from the optical writing unit 40 as a latent image forming device based on image information to form a latent electrostatic image on the photoconductor 3.

The developing unit 5 has a developing roller 51 as a developing agent bearer. To the developing roller 51, a development bias is applied by a power source. A supply screw 52 and a stirring screw 53 are provided that stir a developing agent accommodated in the casing of the developing unit 5 while transferring the developing agent in the opposite direction to each other. In addition, a doctor blade 54 is provided to regulate the layer thickness of the developing agent borne on the developing roller 51.

The toner contained in the developing agent stirred and transferred by the two screws of the supply screw 52 and the stirring screw 53 is charged with a predetermined polarity. The developing agent is then scooped up to the surface of the developing roller 51 and regulated by the doctor blade 54, allowing the toner to be attached to the latent image on the photoconductor 3 in the developing region facing the photoconductor 3.

The cleaning device 6 includes a fur brush 101 and a cleaning blade 62.

The cleaning blade 62 contacts the photoconductor 3 in the counter direction to the movement of the surface of the photoconductor 3.

The lubricant application device 10 includes a solid lubricant 103, a lubricant pressing spring 103*a*, and a fur brush 101, which is used as an application brush to apply the solid lubricant 103 to the photoconductor 3. The solid lubricant 103 is held by a bracket 103*b* and pressed toward the fur brush 101 side by the lubricant pressing spring 103*a*. The solid lubricant 103 is scraped off by the fur brush 101 that is driven to rotate by the photoconductor 3 to apply the lubricant to the photoconductor 3. The lubricant applied to the photoconductor 3 maintains the friction coefficient of the surface of the photoconductor 3 at or below 0.2 during non-image forming. Note that the lubricant application device 10 may be omitted.

The charging device in this embodiment employs a non-contact proximity arrangement method where the charging roller 4 is placed close to the photoconductor 3 without direct contact. As for the charging device, known configurations such as corotron, scorotron, and solid-state charger can be used. Among these charging methods, particularly contact charging methods or non-contact proximity arrangement methods are more desirable, as they offer advantages such as higher charging efficiency, lower ozone generation, and the possibility of device miniaturization.

The light sources for the laser beam L of the optical writing unit 40 and for the light source such as the quenching lamp can utilize various types of light-emitting materials. Specifically, fluorescent lamps, tungsten lamps, halogen lamps, mercury lamps, sodium lamps, light-emitting diodes (LEDs), semiconductor lasers (LDs), electroluminescence (EL), and others can be employed.

In addition, various types of optical filters, for example, a sharp cut filter, a band-pass filter, a near infrared filter, a dichroic filter, a coherent filter and a color conversion filter, can be used to irradiate the photoconductor with the desired wavelength range of light.

Among these light sources, light-emitting diodes and semiconductor lasers are particularly suitable due to their high irradiation energy and their emission of long-wavelength light in the range of 600 to 800 nm.

The transfer unit 60, functioning as a transfer device, includes not only the intermediate transfer belt 14 but also a belt cleaning unit 162, a belt cleaning blade 162*a*, a first bracket 63, and a second bracket 64. Additionally, it includes four primary transfer rollers 7 (primary transfer rollers 7Y, 7C, 7M, and 7K), a secondary transfer backup roller 66, a drive roller 67, an auxiliary roller 68, and a tension roller 69.

The intermediate transfer belt 14 is tensioned across these eight roller components and is driven counterclockwise in FIG. 6 by the rotation of the drive roller 67. The four primary transfer rollers 7 (primary transfer rollers 7Y, 7C, 7M, and 7K) sandwich the intermediate transfer belt 14, thus forming a primary transfer nip with each photoconductor 3, allowing for the intermediate transfer belt 14 to move in an endless manner. Then a transfer bias of opposite polarity (e.g., positive) to the toner is applied to the backside (loop inner surface) of the intermediate transfer belt 14. As the intermediate transfer belt 14 moves endlessly, sequentially passing through primary transfer nips for Y, C, M, and K, the Y, C, M, K toner images on each photoconductor 3 are superimposed and transferred onto its surface. Thus, a four-color overlapping toner image (hereinafter referred to as a four-color toner image) is formed on the intermediate transfer belt 14.

The secondary transfer backup roller 66 forms a secondary transfer nip by sandwiching the intermediate transfer belt 14 between itself and the secondary transfer roller 70, which is arranged on the outside of the loop of the intermediate transfer belt 14. The pair of registration rollers 55 sends out the transfer paper P sandwiched between the rollers towards the secondary transfer nip at a timing synchronized with the four-color toner image on the intermediate transfer belt 14. Due to the secondary transfer electric field formed between the secondary transfer roller 70 to which the secondary transfer bias is applied and the secondary transfer backup roller 66, as well as the pressure within the nip, the four-color toner image on the intermediate transfer belt 14 is collectively secondarily transferred onto the transfer paper P within the secondary transfer nip. This secondarily transferred image forms a full-color toner image when combined with the white color of the transfer paper P.

After passing through the secondary transfer nip, any transfer residual toner remaining on the intermediate transfer belt 14 is removed by the belt cleaning unit 162. The belt cleaning unit 162 includes the belt cleaning blade 162*a*, which is brought into contact with the front edge surface of the intermediate transfer belt 14, thereby scraping off and removing the transfer residual toner from the intermediate transfer belt 14.

The first bracket 63 of the transfer unit 60 is designed to oscillate at a predetermined rotation angle around the rotation axis of the auxiliary roller 68 in response to the on/off operation of a solenoid.

When forming monochrome images, the printer 500 rotates the first bracket 63 slightly counterclockwise in FIG. 6 by driving the solenoid as mentioned above. This rotation causes the primary transfer rollers 7Y, 7C, and 7M for Y, C, and M, respectively, which are centered on the rotation axis of the auxiliary roller 68, to orbit counterclockwise in FIG. 6. As a result, the intermediate transfer belt 14 is separated from the photoconductors 3Y, 3C, and 3M for Y, C, and M, respectively. Consequently, only the imaging unit 1K for K is driven among the imaging units 1 to form a monochrome image. This allows for the reduction of wear and tear on the components constituting each imaging unit 1 due to unnecessary operation caused by driving the imaging units for Y, C, and M during monochrome image formation.

Above the secondary transfer nip in FIG. 6, the fixing unit 80 is arranged. The fixing unit 80 includes a pressure heating roller 81 containing a heat source such as a halogen lamp, along with a fixing belt unit 82. The fixing belt unit 82 includes a fixing belt 84 as a fixing member, a heating roller 83 containing a heat source such as a halogen lamp, a tension roller 85, a drive roller 86, and a temperature sensor. The fixing belt 84 with no end is tensioned by the heating roller 83, tension roller 85, and drive roller 86 while being looped, allowing it to move counterclockwise in FIG. 6. During this endless movement, the fixing belt 84 is heated from the backside by the heating roller 83. The pressure heating roller 81, driven to rotate clockwise in FIG. 6, presses against the front side at the location where the fixing belt 84 contacts the heating roller 83. As a result, a fixing nip is formed where the pressure heating roller 81 and the fixing belt 84 come into contact.

Outside the loop of the fixing belt 84, a temperature sensor is arranged facing the outer surface of the fixing belt 84 with a predetermined gap to detect the surface temperature of the fixing belt 84 just before the fixing belt 84 enters the fixing nip and transmit the detection result to a fixing power supply circuit. Based on the detection result from the temperature sensor, the fixing power supply circuit switches on and off the supply of power by heating sources disposed within the heating roller 83 and the pressure heating roller 81.

The transfer paper P that has passed through the above-mentioned secondary transfer nip is sent to the fixing unit 80 after being separated from the intermediate transfer belt 14. As it is conveyed from the lower side to the upper side within the fixing unit 80 as illustrated in FIG. 6 while being sandwiched by the fixing nip, the full-color toner image is heated and pressed onto the transfer paper P by the fixing belt 84, which fixes the toner image on the transfer paper P.

The transfer paper P with the fixed toner image thereon is ejected to the outside between the rollers of a pair of the sheet ejecting rollers 87. On the upper surface of the housing of the printer 500, a stacking portion 88 is formed, and the transfer paper P ejected to the outside by the pair of the sheet ejecting rollers 87 is sequentially stacked in this stacking portion 88.

Above the transfer unit 60, four toner cartridges, namely a toner cartridge 100Y, a toner cartridge 100C, a toner cartridge 100M, and a toner cartridge 100K (collectively referred to as "each toner cartridge 100"), are arranged to accommodate Y, C, M, and K toners. Y, C, M, and K toners within each toner cartridge 100 are appropriately supplied to each developing unit 1's developing device 5 (developing device 5Y, developing device 5C, developing device 5M, and developing device 5K, respectively). Each toner cartridge 100 is detachably mounted to the printer 500 independently of each developing unit 1.

Image forming operation in the printer 500 is described next.

Upon receiving a print execution signal from an operation unit or the like, a predetermined voltage or current is sequentially applied to the charging roller 4 and the developing roller 51 at predetermined timings. Similarly, a predetermined voltage or current is sequentially applied to light sources such as the optical writing unit 40 and the quenching lamp at predetermined timings. Additionally, synchronized with this application, the photoconductor 3 is rotationally driven in the direction of the arrow indicated in FIG. 6 by a photoconductor driving motor acting as a driving device.

As the photoconductor 3 rotates in the direction of the arrow indicated in FIG. 6, the surface of the photoconductor 3 is uniformly charged to a predetermined potential by the charging roller 4. The optical writing unit 40 emits beams of light L corresponding to image information to the photoconductor 3, quenching (discharging) the irradiated portion of the photoconductor 3 to form a latent electrostatic image. The surface of the photoconductor 3 on which the latent electrostatic image is formed is scraped by a magnetic brush of a developing agent formed on the developing roller 51 at a portion facing the developing unit 5. At this time, the negatively charged toner on the developing roller 51 moves toward the latent electrostatic image by the predetermined development bias applied to the developing roller 51, forming a toner image (development). Similar imaging processes are executed in each developing unit 1, and toner images of each color are formed on the surface of each photoconductor 3 in each developing unit 1.

In the printer 500, the latent electrostatic image formed on the photoconductor 3 is thus reversibly developed using the negatively charged toner by the developing unit 5. In this embodiment, an example using a non-contact charging roller system of N/P (negative/positive: toner adheres to low potential areas) has been described, but the present invention is not limited thereto.

Each color toner image formed on the surface of each photoconductor 3 is sequentially primarily transferred and overlaid onto the surface of the intermediate transfer belt 14. Consequently, a four-color toner image is formed on the intermediate transfer belt 14. The four-color toner image formed on the intermediate transfer belt 14 is transferred onto the transfer paper P fed from either the first paper cassette 151 or the second paper cassette 152 and fed into the secondary transfer nip through the pair of the registration rollers 55. At this point, the transfer paper P is temporarily stopped while being sandwiched between the pair of the registration rollers 55, synchronized with the front end of the image on the intermediate transfer belt 14, and then fed into the secondary transfer nip. Subsequently, the transfer paper P with the toner image thereon is separated from the intermediate transfer belt 14 and conveyed to the fixing unit 80. The toner image is fixed onto the transfer paper P by the action of heat and pressure while the transfer paper P passes through the fixing unit 80. Thereafter, the transfer paper P is ejected outside the printer 500 and stacked in the stacking portion 88.

The surface of the intermediate transfer belt 14 which has transferred the toner image onto the transfer paper P at the secondary transfer nip is cleaned by a belt cleaning unit 162 to remove any residual toner remaining on the surface. Furthermore, the surface of the photoconductor 3 which has transferred the toner images of each color onto the intermediate transfer belt 14 at the primary transfer nip, is cleaned by a cleaning device 6 to remove any residual toner after transfer. Thereafter, lubricant is applied by a lubricant application device 10, and then discharged by a quenching lamp.

As illustrated in FIG. 7, each imaging unit 1 of the printer 500 includes such components as the photoconductor 3, charging roller 4, developing unit 5, cleaning device 6, and lubricant application device 10, all housed within a frame 2. Additionally, the imaging unit 1 is integrally detachable from the printer 500 as a process cartridge. In the printer 500, the imaging unit 1 is configured to exchange the photoconductor 3 and the process device as a single unit. Moreover, it may be configured to replace a component such as the photoconductor 3, charging roller 4, developing unit 5, cleaning device 6, and lubricant application device 10 with a new unit individually.

Furthermore, this printer may be configured to allow single-color image formation. Additionally, it may be configured to perform photocopying based on image data read by an image reading unit.

Process Cartridge

The process cartridge of the present disclosure includes a cleaning blade as a cleaning blade device and other optional device such as an image bearer, a charging device, an exposure device, a developing device, a transfer device, a quenching device, and a lubricant application device.

Each component in the process cartridge is the same as described in the section of Image Forming Apparatus and Image Forming Method) above; therefore, their detailed explanation is omitted.

The aforementioned process cartridge is a device (component) detachably mountable to the image forming apparatus. The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described next in detail with reference to Examples and Comparative Examples but is not limited thereto. "Parts" represents percent by mass unless otherwise specified.

Example 1

Manufacturing of Cleaning Blade

Elastic Member and Supporting Member

A polyurethane elastomer sheet formed by centrifugal molding, followed by curing and post-crosslinking, was used as the elastic member. The average thickness, Martens hardness (HM), and dimensions of the polyurethane elastomer sheet are as follows:

Average thickness: 2.0 mm

Martens hardness (HM): 1.0 N/mm$^2$

Dimension: 356 mm×13.5 mm

Additionally, the end of the polyurethane elastomer sheet was bonded to a metal plate. The material and dimensions of the metal plate are as follows:

Material: Stainless steel sheet

Dimensions: 354 mm×15.6 mm

Preparation of Coating Liquid

Preparation of Particle Dispersion A

Particle dispersion A was prepared by placing 5 parts of polytetrafluoroethylene (PTFE) micro powder (TF9201Z, available from 3M Company, with a volume average particle size of 200 nm) as the first fluororesin, 2 parts of a terpolymer of vinylidene fluoride (VdF), hexafluoropropylene (HFP), and tetrafluoroethylene (TFE) as a second fluororesin, and 93 parts of 1,1,2,2-tetrafluoroethyl 2,2,2-trifluoroethyl ether (HFE-347; available from Tokyo Chemical Industry Co. Ltd.) as a fluorine inert liquid, into a screw tube, followed by stirring it with a stirrer.

The viscosity of the particle dispersion A was 1.85 mPa·s. It was measured using a vibrational viscometer (available from Sekonic Corporation).

Dipping

One end surface (cleaning blade front edge surface) used as the front end of the cleaning blade on the peripheral lateral side was dipped to a depth of 2 mm in the particle dispersion A and then pulled up. At this time, the dipping angle was set to 30 degrees, and the pulling-up speed was set to 5 mm/s. Subsequently, the cleaning blade of Example 1 was prepared by drying at room temperature (25 degrees C.) for 30 minutes.

Assembly of Image Forming Apparatus

The cleaning blade of Example 1 was mounted onto the process cartridge of a color multifunction printer (Imagio MP C4500, available from Ricoh Co., Ltd.) (with a printer unit similar to the printer 500 illustrated in FIG. 6) to assemble the image forming apparatus.

The cleaning blade was attached to the image forming apparatus at a line pressure of 20 g/cm and a cleaning angle of 79 degrees.

Examples 2 to 5 and Comparative Examples 1 to 4

The cleaning blades of Examples 2 to 5 and Comparative Examples 1 to 4 were fabricated in the same manner as in Example 1 except that the dipping angle and the pulling-up speed were changed as shown in Table 1.

Measuring of Average Thickness of Coating Layer

The average thickness of the coating layer was measured by observing the cross-section of the cleaning blade using a laser microscope OLS-4100 (available from Olympus Corporation). Specifically, the coating layer on the surface of the cleaning blade was partially removed using a SEM sample preparation trimming razor (available from Nisshin EM) until the elastic material was exposed. The average thickness of the coating layer was calculated by measuring the height difference between the surface where the coating layer was removed (upper surface of the elastic material) and the surface where the coating layer remained (upper surface of the coating layer). Additionally, the average thickness of the coating layer was determined by measuring five points at distances of 0.02 mm, 0.1 mm, and 0.3 mm away from the front edge ridge part 62*c* of the cleaning blade front edge surface 62*a*, and at positions 41 mm, 110 mm, 178 mm, 247 mm, and 315 mm away from the cleaning blade lateral surface 62*d* in the longitudinal direction, followed by averaging the values obtained from each measurement.

Evaluation on Torque

The thermocouples were mounted to measure the holder temperature of the cleaning blades of Examples 1 to 5 and Comparative Examples 1 to 4, and installed onto the color photocopier Ricoh Pro C9200. Experimental environment: 29 degrees C., 60 percent RH.

Paper feeding conditions: Free run was conducted, paper feeding was continued for 1 hour after the holder temperature of the cleaning blade rose and reached a constant temperature. After paper feeding, the state of the cleaning blade was visually inspected and evaluated according to the following criteria:

Evaluation Criteria

A: No turning-up occurred

C: Turning-up occurred

Evaluation on Cleaning

Examples 1 to 5 and Comparative Examples 1 to 4, the cleaning blades were installed on the Ricoh color photocopier Ricoh Pro C9200.

Experimental environment: 29 degrees C., 60 percent RH.

Paper feeding conditions: 3,600 sheets (A4 landscape) were output using a color stability chart, and the presence of debris on the image bearer, fur brush, and printing paper was visually inspected.

The evaluation was conducted according to the following criteria.

Evaluation Criteria

A: No debris was present

B: Debris was present

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| Average thickness of coating layer at D = 0.02 mm | 0.5 | 1.9 | 3.0 | 2.5 | 1.5 | 5.1 | 5.3 | 2.2 | 0.2 |
| Average thickness of coating layer at D = 0.1 mm | 1.0 | 4.1 | 7.0 | 3.7 | 4.6 | 9.0 | 6.4 | 8.3 | 0.4 |

TABLE 1-continued

| | Example | | | | | Comparative Example | | | |
|---|---|---|---|---|---|---|---|---|---|
| | 1 | 2 | 3 | 4 | 5 | 1 | 2 | 3 | 4 |
| Average thickness of coating layer at D = 0.3 mm | 3.0 | 6.0 | 10.0 | 5.5 | 6.5 | 12.3 | 9.2 | 12.4 | 1.0 |
| Dipping angle (degrees) | 30 | 30 | 30 | 5 | 45 | 30 | 0 | 50 | 30 |
| Speed of pulling-up (mm/s) | 5 | 30 | 45 | 30 | 30 | 55 | 45 | 45 | 1 |
| Evaluation Torque | A | A | A | A | A | A | A | A | C |
| Evaluation Cleaning performance | A | A | A | A | A | C | C | C | A |

In Examples 1 to 5, no turning-up occurred, and there was no debris on the image bearer, fur brush, or printing paper, resulting in excellent performance.

In Comparative Example 1, although turning-up did not occur due to the increased pulling-up speed compared to Example 3, the thickness of the coating layer increased, resulting in debris on the image bearer, fur brush, and printing paper.

In Comparative Example 2, in which the dipping angle to 0 degrees was set compared to Example 3, dripping on the blade front edge surface was reduced, causing an increase in the thickness of the coating layer near the front edge ridge part. The blade did not turn up but debris was observed on the image bearer, fur brush, and printing paper.

In Comparative Example 3, in which the dipping angle was set to 50 degrees compared to Example 3, dripping on the blade front edge surface was accelerated, resulting in an increase in the thickness of the coating layer as the distance from the front edge ridge part increased. The blade did not turn up but debris was observed on the image bearer, fur brush, and printing paper.

In Comparative Example 4, in which the puling-up speed was reduced compared to Example 1, the thickness of the coating layer decreased, preventing debris on the image bearer, fur brush, and printing paper, but the blade turned up.

Aspects of the present disclosure are, for example, as follows.

Aspect 1

A cleaning blade includes an elastic member that includes a front edge surface extending in the longitudinal direction of the elastic member and the thickness direction orthogonal to the longitudinal direction and a bottom surface extending in the depth direction orthogonal to the longitudinal direction and the thickness direction, the bottom surface sharing a front edge ridge part with the front edge surface and facing a cleaning target, and a coating layer coating the front edge surface, the front edge ridge part, and the bottom surface, wherein the front edge ridge part coated with the coating layer is in contact with a surface of the cleaning target, and the coating layer has an average thickness that increases with an increase in a distance from the front edge ridge part in the thickness direction on the front edge surface.

Aspect 2

The cleaning blade according to Aspect 1 mentioned above, wherein the coating layer has an average thickness of 0.5 to 3 m on the front end at a distance of 0.02 mm from the front edge ridge part, an average thickness of 1 to 7 m on the front end at a distance of 0.1 mm from the front edge ridge part, and an average thickness of 3 to 10 m on the front end at a distance of 0.3 mm from the front edge ridge part.

Aspect 3

The cleaning blade according to Aspect 1 or 2 mentioned above, wherein the coating layer contains a first fluorine resin and a second fluorine resin incompatible with the first fluorine resin.

Aspect 4

A method of manufacturing the cleaning blade of any one of Aspects 1 to 3 mentioned above includes dipping the elastic member in a coating liquid with an angle formed between a surface of the coating liquid and the front edge surface is 5 to 45 degrees and pulling up the elastic member from the coating liquid.

Aspect 5

The method according to Aspect 4 mentioned above, wherein the coating liquid contains a first fluororesin, a second fluororesin incompatible with the first fluororesin, and a fluorine inert liquid.

Aspect 6

The method according to Aspect 5 mentioned above, wherein the proportion of the entire mass of the first fluororesin and the second fluororesin is from 5 to 10 percent by mass to an entire mass of the coating liquid and the proportion of an entire mass of the fluorine inert liquid is from 90 to 95 percent by mass to the entire mass of the coating liquid.

Aspect 7

The method according to Aspect 5 or 6 further includes measuring each content of the first fluororesin, the second fluororesin, and the fluorine inert liquid and adjusting the speed of the pulling up of the elastic member in accordance with the content measured in the measuring.

Aspect 8

The method according to any one of Aspects 5 to 7 mentioned above, further includes measuring each content of the first fluororesin, the second fluororesin, and the fluorine inert liquid and filling the fluorine inert liquid in accordance with the content measured in the measuring to adjust the speed of the pulling up of the elastic member.

Aspect 9

A process cartridge includes the cleaning blade of any one of Aspects 1 to 3 mentioned above.

Aspect 10

An image forming apparatus includes the cleaning blade of any one of Aspects 1 to 3 mentioned above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A cleaning blade, comprising:

an elastic member comprising:

a front edge surface extending in a longitudinal direction of the elastic member and a thickness direction orthogonal to the longitudinal direction; and a bottom surface extending in a depth direction orthogonal to the longitudinal direction and the thickness direction, the bottom surface sharing a front edge ridge part with the front edge surface and facing a cleaning target; and a coating layer coating the front edge surface, the front edge ridge part, and the bottom surface, wherein the front edge ridge part coated with the coating layer is in contact with a surface of the cleaning target, wherein the coating layer has an average thickness that increases with an increase in a distance from the front edge ridge part in the thickness direction on the front edge surface, and wherein the coating layer comprises;

a first fluorine resin; and a second fluorine resin incompatible with the first fluorine resin.

2. The cleaning blade according to claim 1, wherein the coating layer has an average thickness of 0.5 to 3 μm on the front edge surface at a distance of 0.02 mm from the front edge ridge part, an average thickness of 1 to 7 μm on the front edge surface at a distance of 0.1 mm from the front edge ridge part, and an average thickness of 3 to 10 μm on the front edge surface at a distance of 0.3 mm from the front edge ridge part.

3. A method of manufacturing the cleaning blade of claim 1, comprising:

dipping the elastic member in a coating liquid with an angle formed between a surface of the coating liquid and the front edge surface is 5 to 45 degrees; and pulling up the elastic member from the coating liquid, wherein the coating liquid comprises:

a first fluororesin;

a second fluororesin incompatible with the first fluororesin; and a fluorine inert liquid.

4. The method according to claim 3, wherein a proportion of an entire mass of the first fluororesin and the second fluororesin is from 5 to 10 percent by mass to an entire mass of the coating liquid and a proportion of an entire mass of the fluorine inert liquid is from 90 to 95 percent by mass to the entire mass of the coating liquid.

5. The method according to claim 4, further comprising:

measuring each content of the first fluororesin, the second fluororesin, and the fluorine inert liquid; and adjusting a speed of the pulling up of the elastic member in accordance with the content measured in the measuring.

6. The method according to claim 4, further comprising:

measuring each content of the first fluororesin, the second fluororesin, and the fluorine inert liquid; and filling the fluorine inert liquid in accordance with the content measured in the measuring to adjust a speed of the pulling up of the elastic member.

7. A process cartridge, comprising:

the cleaning blade of claim 1.

8. An image forming apparatus, comprising:

the cleaning blade of claim 1.

* * * * *